United States Patent
Verma et al.

(10) Patent No.: US 11,283,766 B2
(45) Date of Patent: *Mar. 22, 2022

(54) NETWORK LAYER SIGNALING SECURITY WITH NEXT GENERATION FIREWALL

(71) Applicant: Palo Alto Networks, Inc., Santa Clara, CA (US)

(72) Inventors: Sachin Verma, Danville, CA (US); Leonid Burakovsky, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/868,428

(22) Filed: May 6, 2020

(65) Prior Publication Data
US 2020/0267123 A1 Aug. 20, 2020

Related U.S. Application Data

(63) Continuation of application No. 15/895,946, filed on Feb. 13, 2018, now Pat. No. 10,701,033.

(51) Int. Cl.
*H04L 29/06* (2006.01)
*G06F 21/00* (2013.01)
*H04W 12/08* (2021.01)

(52) U.S. Cl.
CPC ........ *H04L 63/0236* (2013.01); *H04L 63/164* (2013.01); *H04L 63/20* (2013.01); *H04W 12/08* (2013.01)

(58) Field of Classification Search
CPC .............. H04L 63/0236; H04L 63/166; H04L 63/0245; H04L 63/20; H04L 63/0209; H04L 63/168; H04L 63/1441; H04L 63/164; H04L 63/1466; H04W 12/08; H04W 12/088
See application file for complete search history.

(56) References Cited

U.S. PATENT DOCUMENTS

| 7,849,502 B1 | 12/2010 | Bloch |
| 7,983,265 B1 | 7/2011 | Dropps |
| 8,547,974 B1 | 10/2013 | Guruswamy |
| 2003/0231654 A1 | 12/2003 | Gilchrist |

(Continued)

FOREIGN PATENT DOCUMENTS

| JP | 2007195173 | 8/2007 |
| JP | 2008536231 | 9/2008 |
| JP | 2008541590 | 11/2008 |

OTHER PUBLICATIONS

Author Unknown, Stream Control Transmission Protocol (SCTP) Parameters, Nov. 11, 2017.
ETSI, European Telecommunication Standard, ETS 300 374-1, Intelligent Network (IN; Intelligent Network Capability Set 1 (CS1), Core Intelligent Network Application Protocol (INAP), Part 1: Protocol Specification, Sep. 1994.

(Continued)

*Primary Examiner* — Lisa C Lewis
(74) *Attorney, Agent, or Firm* — Van Pelt, Yi & James LLP

(57) ABSTRACT

Techniques for network layer signaling security with next generation firewall are disclosed. In some embodiments, a system/process/computer program product for network layer signaling security with next generation firewall includes monitoring a network layer signaling protocol traffic on a service provider network at a security platform; and filtering the network layer signaling protocol traffic at the security platform based on a security policy.

20 Claims, 21 Drawing Sheets

(56) References Cited

U.S. PATENT DOCUMENTS

| | | | |
|---|---|---|---|
| 2005/0022011 A1* | 1/2005 | Swander | H04L 63/0227 726/4 |
| 2005/0108518 A1* | 5/2005 | Pandya | H04L 63/20 713/151 |
| 2007/0121596 A1* | 5/2007 | Kurapati | H04L 29/06027 370/356 |
| 2007/0173226 A1 | 7/2007 | Cai | |
| 2009/0007220 A1* | 1/2009 | Ormazabal | H04L 63/1466 726/1 |
| 2012/0002654 A1 | 1/2012 | Pekkala | |
| 2014/0105103 A1* | 4/2014 | Nethi | H04L 63/1408 370/328 |
| 2016/0080316 A1* | 3/2016 | Gonzalez Pizarro | H04L 61/2503 709/245 |
| 2018/0249281 A1* | 8/2018 | McCann | H04L 67/12 |

OTHER PUBLICATIONS

Fajardo et al., Internet Engineering Task Force (IETF), Diameter Base Protocol, RFC 6733, Oct. 2012.

International Telecommunication Union, ITU-T, Telecommunication Standardization Sector of ITU, Q.2220, Series Q: Switching and Signalling, Broadband ISDN—Signalling Network Protocols, Transport-Independent Signalling Connection Control Part (TI-SCCP), Dec. 2002.

Loren et al., Stuff, Spark Mobile Network Still "Patchy" across NZ after Earlier Outages, Jan. 29, 2017.

Marius Jorgenrud, SS7 Signaling, A Malicious Attack Against Telenor Would Have the Same Consequence, Feb. 22, 2016.

Ong et al., Network Working Group, RFC 2719—Framework Architecture for Signaling Transport, Oct. 1999.

R. Stewart, Network Working Group, Steam Control Transmission Protocol, Sep. 2007.

* cited by examiner

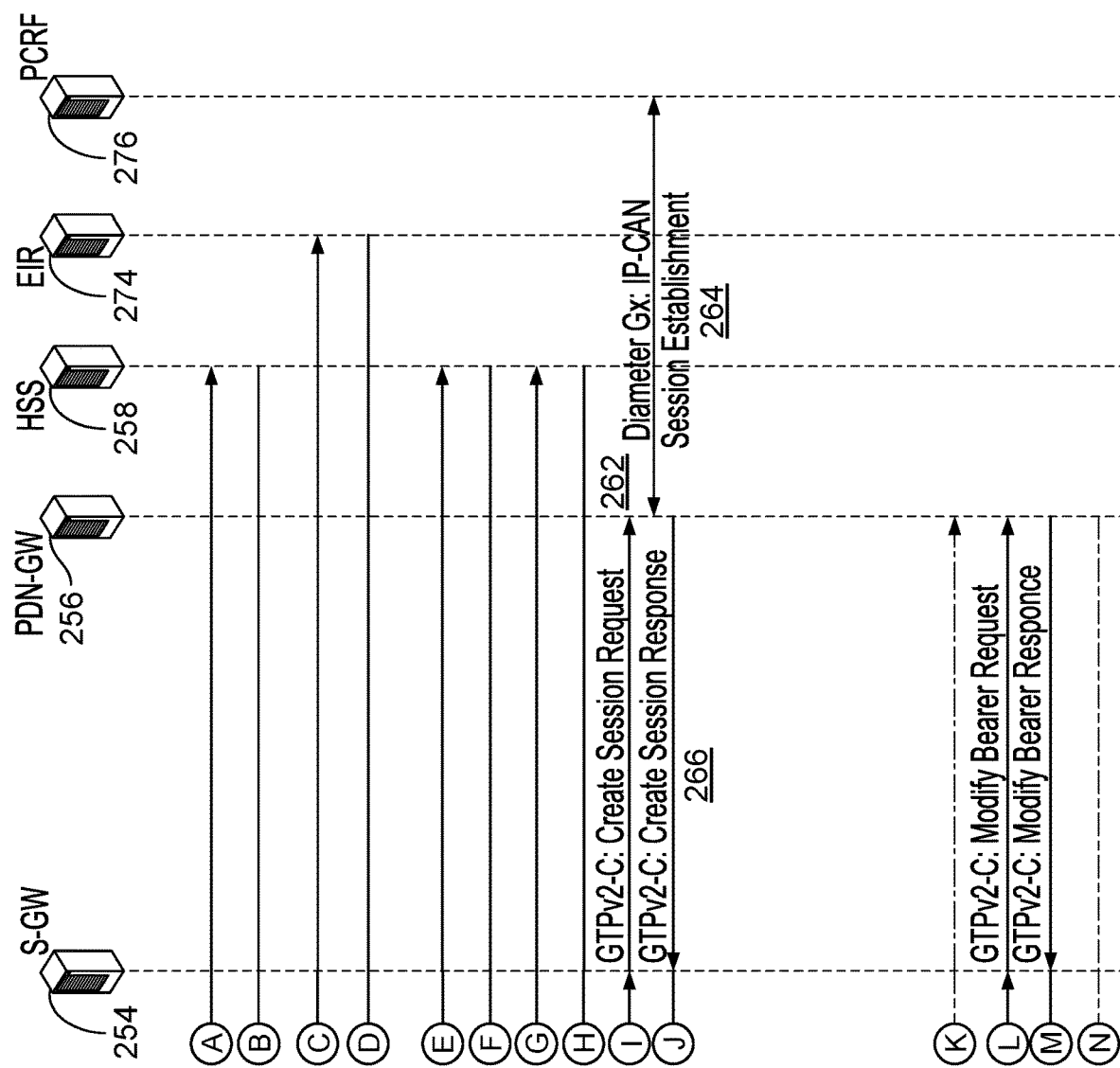
FIG. 2B (Cont...)

NETWORK LAYER SIGNALING SECURITY WITH NEXT GENERATION FIREWALL

CROSS REFERENCE TO OTHER APPLICATIONS

This application is a continuation of co-pending U.S. patent application Ser. No. 15/895,946 entitled NETWORK LAYER SIGNALING SECURITY WITH NEXT GENERATION FIREWALL filed Feb. 13, 2018 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1A:
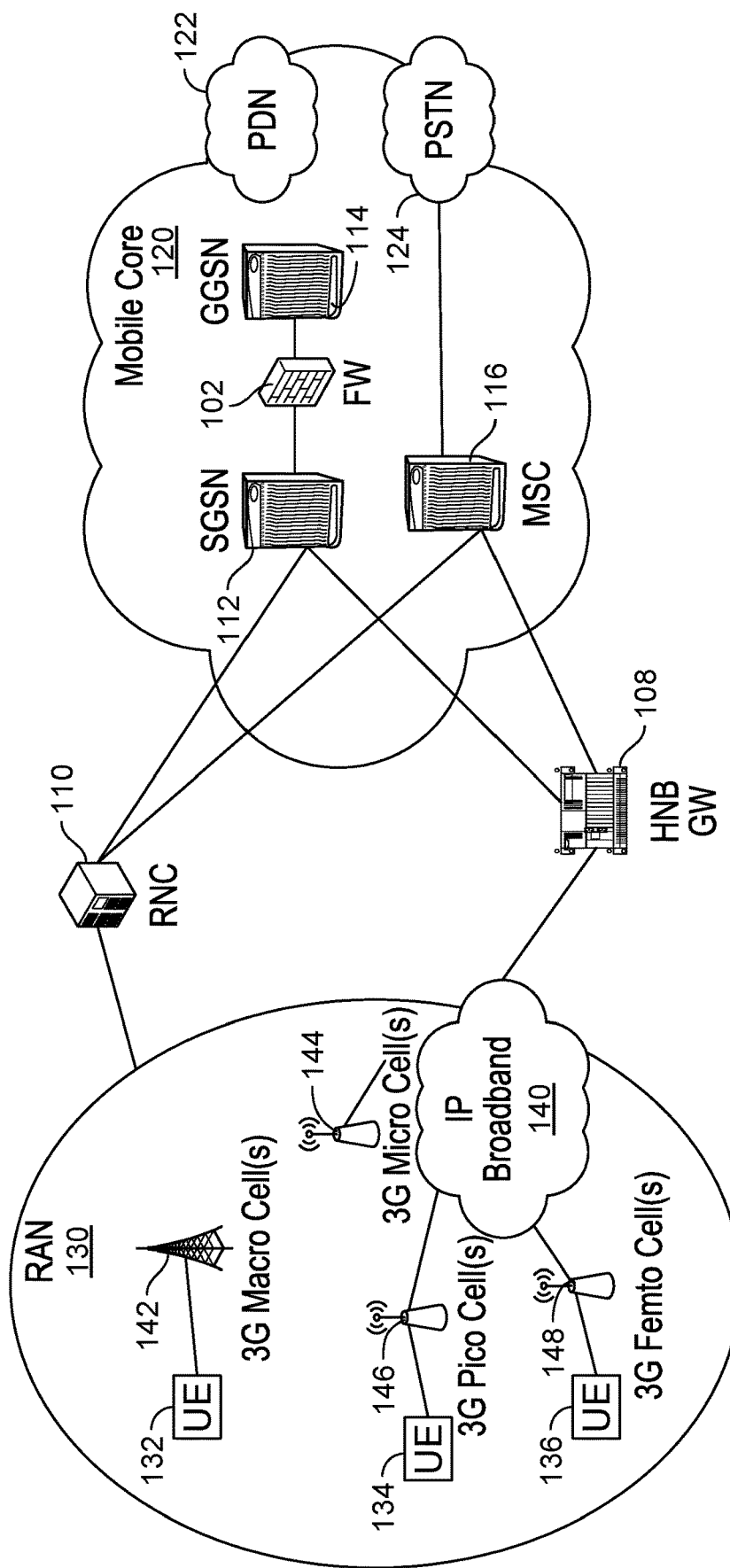
FIG. 1A is a block diagram of a 3G wireless network with a security platform for providing enhanced security in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls and Palo Alto Networks' VM Series virtualized next generation firewalls).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Technical and Security Challenges in Today's Mobile Networks for Service Providers In today's service provider network environments, the service provider can typically only implement a static security policy for wireless devices communicating over the service provider's wireless network (e.g., the service provider cannot define a security/firewall policy on a per endpoint basis and/or a per flow basis for wireless devices communicating over the service provider's wireless network), and any changes generally require network infrastructure updates. Further, in today's service provider network environments, the service provider generally cannot implement a security policy that is based on hardware attributes or location information associated with the wireless devices for wireless devices communicating over the service provider's wireless network (e.g., the service provider cannot implement the security policy based on packet content inspection and/or based on various other relevant parameters associated with wireless devices, such as an access point of a device communicating over the wireless network).

Thus, technical and security challenges with service provider networks exist. As such, what are needed are new and improved security techniques for such service provider network environments. Specifically, what are needed are new and improved solutions for monitoring service provider network traffic and, more specifically, improved solutions for solving signaling traffic related security problems for service provider networks, including, for example, performing packet content inspection of various protocols used on various interfaces within GSM (Global System for Mobile Communication), UMTS (Universal Mobile Telecommunications System), LTE (Long Term Evolution) networks, GTPv1-C used in 3G networks, and/or GTPv2-C used in 4G/LTE networks, and applying security policies (e.g., firewall policies) on service provider networks to facilitate enhanced security for service provider networks.

Overview of Techniques for Enhanced Security in Mobile Networks for Service Providers Accordingly, techniques for enhanced security platforms within service provider network environments are disclosed. Specifically, various system architectures for implementing and various processes for providing security platforms within service provider network environments that can monitor various protocols used on various interfaces are disclosed. More specifically, various system architectures for implementing and various processes for providing security platforms within service provider network environments that can monitor various protocols used on various interfaces within GSM (Global System for Mobile Communication), UMTS (Universal Mobile Telecommunications System), LTE (Long Term Evolution) networks, GTPv1-C used in 3G networks, and/or GTPv2-C used in 4G/LTE networks, and applying security policies (e.g., firewall policies) on service provider networks are disclosed. For example, the disclosed techniques facilitate applying security policies based on an application, IP address, content ID, subscriber location, unique device identifier (e.g., International Mobile Equipment Identifier (IMEI) for a generally unique 3GPP device identifier, such as for mobile phones for a Global System for Mobile Communications (GSM) network), unique subscriber identifier (e.g., International Mobile Subscriber Identity (IMSI) for uniquely identifying a GSM subscriber), Radio Access Technology (RAT) (e.g., for identifying the associated RAT for the mobile device), any other information extracted from the decoded signaling traffic on a mobile service provider network to solve signaling security problems and facilitate enhanced security on service provider networks (e.g., throttling specific messages/traffic to prevent/mitigate denial of service (DoS) attacks or to counter other attacks/vulnerabilities in one or more signaling protocols), and/or any combination thereof using next generation firewalls on service provider networks, such as further described below.

In one embodiment, the security platform is configured to monitor traffic in the mobile core/service provider's core network (e.g., including monitoring various protocols used for signaling traffic which are specified in 3GPP releases of 3G networks, 3GPP releases of 4G networks, and 3GPP releases of 5G networks) to perform packet content inspection security monitoring techniques that can be utilized for applying security policies based on information extracted from signaling messages and/or user session traffic, as will be further described below. For example, the security platform can be configured to dynamically apply security policy per IP flow (e.g., per source/destination IP address(es)) for wireless devices. In an example implementation, the security platform can be configured to dynamically apply security policy per IP flow for wireless devices by monitoring signaling traffic (e.g., at one or more layers, such as transport, network, and/or application layers) on a mobile service provider network and dynamically correlating the signaling layer(s) with the data layer(s) security to facilitate enhanced security on the service provider network (e.g., implementing a consolidated view into signaling and data layers security platform offering for various signaling protocols including, for example, the following: Stream Control Transport Protocol (SCTP) (a signaling transport layer protocol specified in RFC 4960 available at https://tools.ietf.org/html/rfc4960), S1-APP/MME, Diameter (an authentication, authorization, and accounting signaling protocol that can utilize SCTP for its signaling transport protocol, and Diameter is specified in multiple RFCs of the Internet Engineering Task Force (IETF), including RFC 6733 available at https://tools.ietforg/html/rfc6733), Mobile Application Part (MAP) (an SS7/application layer signaling protocol specified in ITU Q.2220 available at http://www.itu.int/rec/T-REC-Q.2220/en/), CAMEL Application Part (CAP) (an SS7/application layer signaling protocol specified in 3GPP TS 29.078 available at https://portal.3gpp.org/desktopmodules/Specifications/SpecificationDetails.aspx?specificanonId=1597), Intelligent Network Application Part (INAP) (an SS7/application layer signaling protocol specified in ETSI specification ETS 300 374-1 available at http://www.etsi.org/deliver/etsi_i_ets/300300_300399/30037401/01_60/ets_30037401e01p.pdf), Signaling Control Connection Protocol (SCCP) (a signaling network layer protocol that can utilize SCTP for its signaling transport protocol, and SCCP is specified in multiple ITU recommendations of the International Telecom Union (ITU), including ITU Q.711 available at http://www.itu.int/rec/T-REC-Q.711/en/ and ITU Q.714 available at http://www.itu.int/rec/T-REC-Q.714/en/), and signaling transport (SIGTRAN) (a signaling transport layer protocol specified in RFC 2719 available at https://tools.ietf.org/html/rfc2719), and GTPv2-C specified in 3GPP T.S. 29.274, and GTPv1-C specified in 3GPP T.S. 29.060).

When a mobile device attaches to the network (e.g., a 3GPP/LTE EPC network), the anchor gateway (e.g., the Packet Data Network (PDN) Gateway or PGW in a 3GPP/LTE EPC network) will generally query a Policy Charging Function and Control (PCRF) entity over the Gx interface to determine the policy for that subscriber. The PCRF entity will send back to the PGW information about, for example, QoS, filters, and/or other policy related information that is stored in the PCRF entity for that subscriber that is to be applied for this subscriber (e.g., the PCRF entity is generally used to manage/control bandwidth and QoS on wireless networks; and the AAA server is generally used for authentication purposes on wireless networks).

In one embodiment, a security platform is configured to monitor the GTP communications between the SGSN and GGSN in the mobile core network (e.g., next generation firewall, which can monitor various GTP-C messages exchanged for activation, updating, and/or deactivation of the GTP sessions in the service provider's network as further described below), and the security platform (e.g., a firewall (FW), a network sensor acting on behalf of the firewall, or another device/component that can implement security policies using the disclosed techniques) is configured to apply a security policy using one or more parameters extracted from the GTP-C messages as further described below. Thus, service providers, IoT device providers, and/or system integrators can use the disclosed techniques to configure and enforce enhanced security policies using one or more parameters extracted from the GTP-C messages as further described below.

In one embodiment, a security platform is configured to monitor the GTP communications between the SGSN and GGSN in the mobile core network (e.g., next generation firewall, which can monitor GTP-U traffic during GTP sessions in the service provider's network as further described below), and the security platform (e.g., a firewall (FW), a network sensor acting on behalf of the firewall, or another device/component that can implement security policies using the disclosed techniques) is configured to apply a security policy using one or more parameters extracted from the GTP-C messages and based on the user session traffic monitored by the security platform during the GTP session (e.g., Application ID, Content ID, URL filtering, and/or other stateful packet inspection extracted from the user traffic during the GTP session) as further described below. Thus, service providers, IoT device providers, and/or system integrators can use the disclosed techniques to configure and enforce enhanced security policies using one or more parameters extracted from the GTP-C messages and information extracted from user traffic in GTP sessions as further described below.

For example, service providers, IoT device providers, and/or system integrators can apply different security policies based on IMEI, IMSI, location, RAT, any other information extracted from the decoded signaling traffic on a mobile service provider network, and/or any combination thereof using next generation firewalls on service provider networks, such as further described below. As another example, service providers, IoT device providers, and/or system integrators can apply different security policies based on IMEI, IMSI, location, RAT, and/or any other information extracted from the decoded signaling traffic on a mobile service provider network, based on monitored user traffic during GTP sessions.

In one embodiment, a security platform (e.g., a firewall, a network sensor acting on behalf of the firewall, or another device/component that can implement security policies) is configured to use existing 3GPP to dynamically apply security policies (e.g., granular security policies, which can be applied per subscriber (e.g., IMSI)/IP in real-time, per mobile device (e.g., IMEI)/IP in real-time, per subscriber location/IP in real-time, per RAT/IP in real-time, and/or any combinations thereof) as data calls are set-up and/or modified/updated using the disclosed techniques, such as further described below. For example, the security platform can be configured to dynamically apply security policy per IP flow for wireless devices.

In one embodiment, the signaling messages (e.g., messages exchanged for activation, updating, and deactivation of tunneling sessions) in the mobile core/service provider's core network are existing and/or standard messages as used in current 3GPP EPC (e.g., GTP-C messages, such as GTPv1-C for 3G networks and GTPv2-C for 4G networks) and/or other wireless network environments, and the security platform is configured to monitor such messages to extract one or more parameters that can be utilized for applying security policies from these messages, as will be further described below.

In one embodiment, the security platform is configured to monitor user session traffic in tunneling sessions in the mobile core/service provider's core network (e.g., GTP-U traffic) to perform packet content inspection security monitoring techniques that can be utilized for applying security policies based on the user session traffic, as will be further described below.

In one embodiment, a security platform is configured to monitor sessions (e.g., including monitoring various protocols used for signaling traffic which are specified in 3GPP releases of 3G networks, 3GPP releases of 4G networks, and 3GPP releases of 5G networks) to/from various network elements in the service provider network to perform packet content inspection security monitoring techniques that can be utilized for applying security policies based on the session traffic, as will be further described below.

In one embodiment, a subscriber/IP address is associated with (e.g., mapped to) a security policy to facilitate security policy enforcement per IP flow using the security platform (e.g., a next generation firewall (NGFW)). For example, the security platform can apply a granular security policy based on information extracted from the signaling messages and/or user session traffic, as will be further described below.

In one embodiment, the security platform (e.g., a next generation firewall (NGFW)) monitors signaling transport traffic, including SCTP protocol traffic. For example, the security platform can filter SCTP protocol traffic, including performing stateful inspection, SCTP protocol validation, and/or SCTP multi-chunk inspection (e.g., configured in an SCTP protection security profile in a security policy implemented by the security platform).

In one embodiment, the security platform (e.g., a next generation firewall (NGFW)) monitors signaling transport traffic (e.g., signaling transport traffic and higher layers of signaling traffic) on service provider's core networks. For example, the security platform can filter signaling transport traffic (e.g., SIGTRAN messages), including performing stateful inspection, SCTP protocol validation, and/or SCTP multi-chunk inspection (e.g., configured in an SCTP protection security profile in a security policy implemented by the security platform).

In one embodiment, the security platform (e.g., a next generation firewall (NGFW)) monitors upper layer signaling protocols. For example, the security platform can filter layer-7/application layer signaling protocol layers (e.g., filtering per SSN, GT, and Opcode, including support for filtering protocols used in a Signaling System No. 7 (SS7) network).

In one embodiment, the security platform (e.g., a next generation firewall (NGFW)) monitors Diameter signaling traffic. For example, the security platform can perform Diameter protocol filtering per Application ID (e.g., example application IDs for Diameter filtering can include one or more of the following: Diameter Common Messages, Diameter Base Accounting, Diameter Credit Control, 3GPP S6a/S6d, 3GPP S9, 3GPP S13/S13', 3GPP S6c, 3GPP Sh, and 3GPP Rx), Command Code (e.g., various command codes, such as 3GPP-Update-Location for 3GPP Application ID: 3GPP-S6a/S6d, Credit-Control for Application ID:

3GPP-S9, 3Gpp-ME-Identity-Check for Application ID: 3GPP-513, Credit-Control for Application ID: Diameter Credit Control, etc.), and AVP (e.g., a range of range 0-16777215).

These and other embodiments and examples of techniques for providing security platforms that facilitate enhanced signaling security on service provider network environments are further described below.

Example System Architectures for Implementing Enhanced Security in Mobile Networks for Service Providers FIG. 1A is a block diagram of a 3G wireless network with a security platform for providing enhanced security in accordance with some embodiments. FIG. 1A is an example service provider network environment for a 3G network architecture that includes a 3G network (e.g., and can also include Wired, Wi-Fi, 4G, 5G, and/or other networks (not shown in FIG. 1A)) to facilitate data communications for subscribers over the Internet and/or other networks. As shown in FIG. 1A, a Radio Access Network (RAN) 130 is in communication with a mobile core network 120. RAN 130 can include Macro Cell(s) 142 in the wireless network, and small cells, such as 3G Micro Cell(s) 144, 3G Pico Cell(s) 146, and 3G Femto Cells 148 in the wireless network. As shown, various User Equipment (UE) 132, 134, and 136 can communicate using various cells in RAN 130.

As also shown in FIG. 1A, the small cells, shown as 3G Micro Cell(s) 144, 3G Pico Cell(s) 146, and 3G Femto Cell(s) 148, are in network communication with a Home Node B Gateway (HNB GW) 108 over IP Broadband wireless network 140 and, in this example, the traffic is monitored/filtered using a security platform 102 (e.g., a (virtual) device/appliance that includes a firewall (FW), a network sensor acting on behalf of the firewall, or another device/component that can implement security policies using the disclosed techniques) configured to perform the disclosed security techniques as further described below. As also shown, Macro Cell(s) (NodeB) 142 is in network communication with the Radio Network Controller (RNC) 110, and the traffic is monitored/filtered using a security platform 102 (e.g., a firewall (FW), a network sensor acting on behalf of the firewall, or another device/component that can implement security policies using the disclosed techniques) configured to perform the disclosed security techniques as further described below.

As also shown in FIG. 1A, HNB GW 108 and RNC 110 are each in communication with a Packet Data Network (PDN) 122 via a Serving GPRS Support Node (SGSN) 112 and a Gateway GPRS Support Node (GGSN) 114 of a mobile (3G) core network 120 and with a Public Switched Telephone Network (PSTN) 124 via a Mobile Switching Center (MSC) 116 of mobile core network 120. As shown, the traffic passing through the mobile core network between SGSN 112 and GGSN 114 of mobile core network 120 is monitored/filtered using a security platform 102 (e.g., a firewall (FW), a network sensor acting on behalf of the firewall, or another device/component that can implement security policies using the disclosed techniques) configured to perform the disclosed security techniques as further described below.

For example, various UE, such as the UE shown at 132, 134, and 136, can include mobile and/or stationary wireless network enabled devices that can communicate over RAN 130 to access PDN 122, such as a security camera (e.g., which may be in a fixed location), a watch, mobile/smart phone, tablet, laptop, computer/PC or other computing device (which may be mobile or at a fixed location), an automobile, a baby monitor, a thermostat, and/or various other network enabled computing devices (e.g., any device associated with the Internet of Things (IoT)). Various use case scenarios applying the disclosed security techniques to wireless network enabled devices to facilitate new and enhanced security will be further described below.

Thus, in this example, a network architecture for performing the disclosed security techniques for a 3G network implementation is provided in which a security platform(s) can be provided to perform traffic monitoring and filtering to provide new and enhanced security techniques based on signaling and packet content inspection information as further described below. As will now be apparent to one of ordinary skill in the art in view of the disclosed embodiments, a security platform(s) can similarly be provided in various other locations within the network architecture (e.g., an inline, pass-through NGFW, such as shown by FW 102, and/or implemented as agents or virtual machines (VM) instances, which can be executed on existing devices in the service provider's network, such as SGSN 112 and/or GGSN 114) and in various wireless network environments, such as 3G, 4G, 5G, and/or other wireless network environments to perform the disclosed security techniques as further described below. As also described further below, the disclosed security techniques can similarly be applied to roaming devices that connect to the mobile core of the wireless network environment.

Figure 1B:
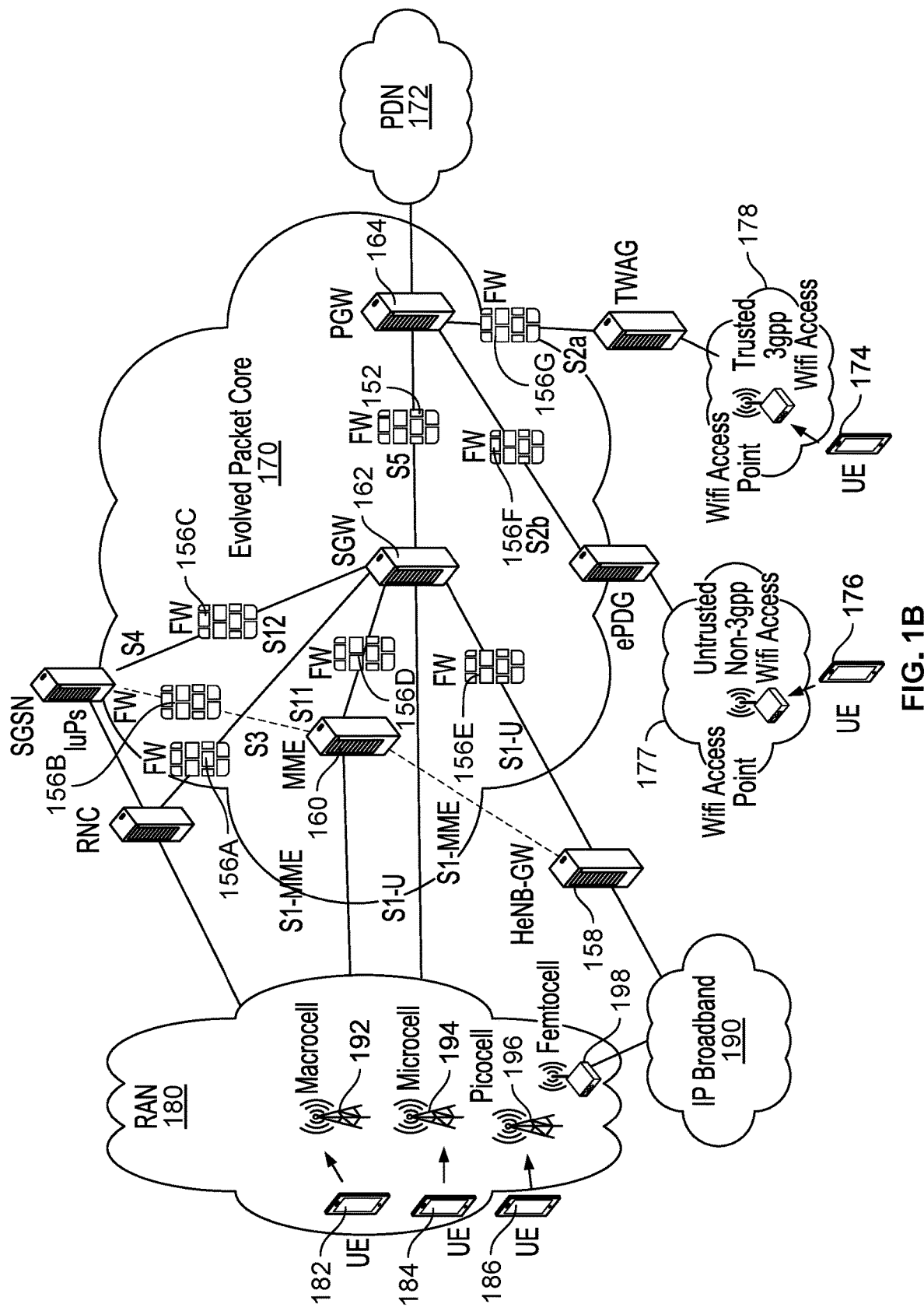
FIG. 1B is a block diagram of a 4G/LTE wireless network with a security platform for providing enhanced security in accordance with some embodiments.

FIG. 1B is a block diagram of a 4G/LTE wireless network with a security platform for providing enhanced security in accordance with some embodiments. FIG. 1B is an example service provider network environment for a 4G/Long Term Evolution (LTE) Evolved Packet Core (EPC) network architecture that includes a 4G/LTE network (e.g., and can also include Wired, Wi-Fi, 3G, 5G, and/or other networks) to facilitate data communications for subscribers over the Internet and/or other networks. As shown in FIG. 1B, a Radio Access Network (RAN) 180 is in communication with an Evolved Packet Core (EPC) network 170. RAN 180 can include LTE Macrocell(s) 192 in the wireless network, and small cells, such as LTE Microcell(s) 194, LTE Picocell(s) 196, and LTE Femtocells 198 in the wireless network. As shown, various User Equipment (UE) 182, 184, and 186 can communicate using various cells in RAN 180.

As also shown in FIG. 1B, Femtocell(s) 198 is in network communication with a Home eNode B Gateway (HeNB GW) 158 over IP Broadband wireless network 190, and, in this example, the traffic is monitored/filtered using a security platform 156E (e.g., a (virtual) device/appliance that includes a firewall (FW), a network sensor acting on behalf of the firewall, or another device/component that can implement security policies using the disclosed techniques) configured to perform the disclosed security techniques as further described below. As also shown, Macro Cell(s) 192 is in network communication with a Mobility Management Entity (MME) 160 and a Serving Gateway (SGW) 162, and the traffic is monitored/filtered using a FW 156D, and, in this example, the traffic is monitored/filtered using a security platform (e.g., a (virtual) device/appliance that includes a firewall (FW), a network sensor acting on behalf of the firewall, or another device/component that can implement security policies using the disclosed techniques) configured to perform the disclosed security techniques as further described below.

As also shown in FIG. 1B, HeNB GW 158 is in communication with a Packet Data Network (PDN) 172 via SGW 162 and a PDN Gateway (PGW) 164 of Evolved Packet Core (EPC) network 170. As shown, the traffic passing through the mobile core network between SGW 162 and GGSN/PGW 164 of EPC 170 is monitored/filtered using a security platform 152 (e.g., a (virtual) device/appliance that includes a firewall (FW), a network sensor acting on behalf of the firewall, or another device/component that can implement security policies using the disclosed techniques) configured to perform the disclosed security techniques as further described below.

For example, various UEs, such as UEs shown at 174, 176, 182, 184, and 186, can include mobile and/or stationary wireless network enabled devices that can communicate over RAN 180, Untrusted Non-3GPP Wi-Fi access 177, and/or Trusted 3GPP Wi-Fi access 178, to access PDN 172 via EPC 170 in which such communications can be monitored using security platforms 152, 156A, 156B, 156C, 156D, 156E, 156F, and/or 156G as shown in FIG. 1B (e.g., the security platforms can be located at various locations/interfaces within EPC 170 as shown in FIG. 1B) and as further described below. Example UEs can include a security camera (e.g., which may be in a fixed location), a watch, mobile/smart phone, tablet, laptop, computer/PC or other computing device (which may be mobile or at a fixed location), an automobile, a baby monitor, a thermostat, and/or various other network enabled computing devices (e.g., any device associated with the Internet of Things (IoT)). Various use case scenarios applying the disclosed security techniques to wireless network enabled devices to facilitate new and enhanced security will be further described below.

Thus, in this example, a network architecture for performing the disclosed security techniques for a 4G/LTE EPC network implementation is provided in which a security platform(s) can be provided to perform traffic monitoring and filtering to provide new and enhanced security techniques based on signaling and packet content inspection information as further described below. As will now be apparent to one of ordinary skill in the art in view of the disclosed embodiments, a security platform(s) can similarly be provided in various other locations within the network architecture (e.g., an inline, pass-through NGFW, such as shown by FW 152, and/or implemented as agents or virtual machines (VM) instances, which can be executed on existing devices in the service provider's network, such as SGW 162 and/or PGW 164) and in various wireless network environments, such as 3G, 4G, 5G, and/or other wireless network environments to perform the disclosed security techniques as further described below. As also described further below, the disclosed security techniques can similarly be applied to roaming devices that connect to the mobile core of the wireless network environment.

Figure 2A:
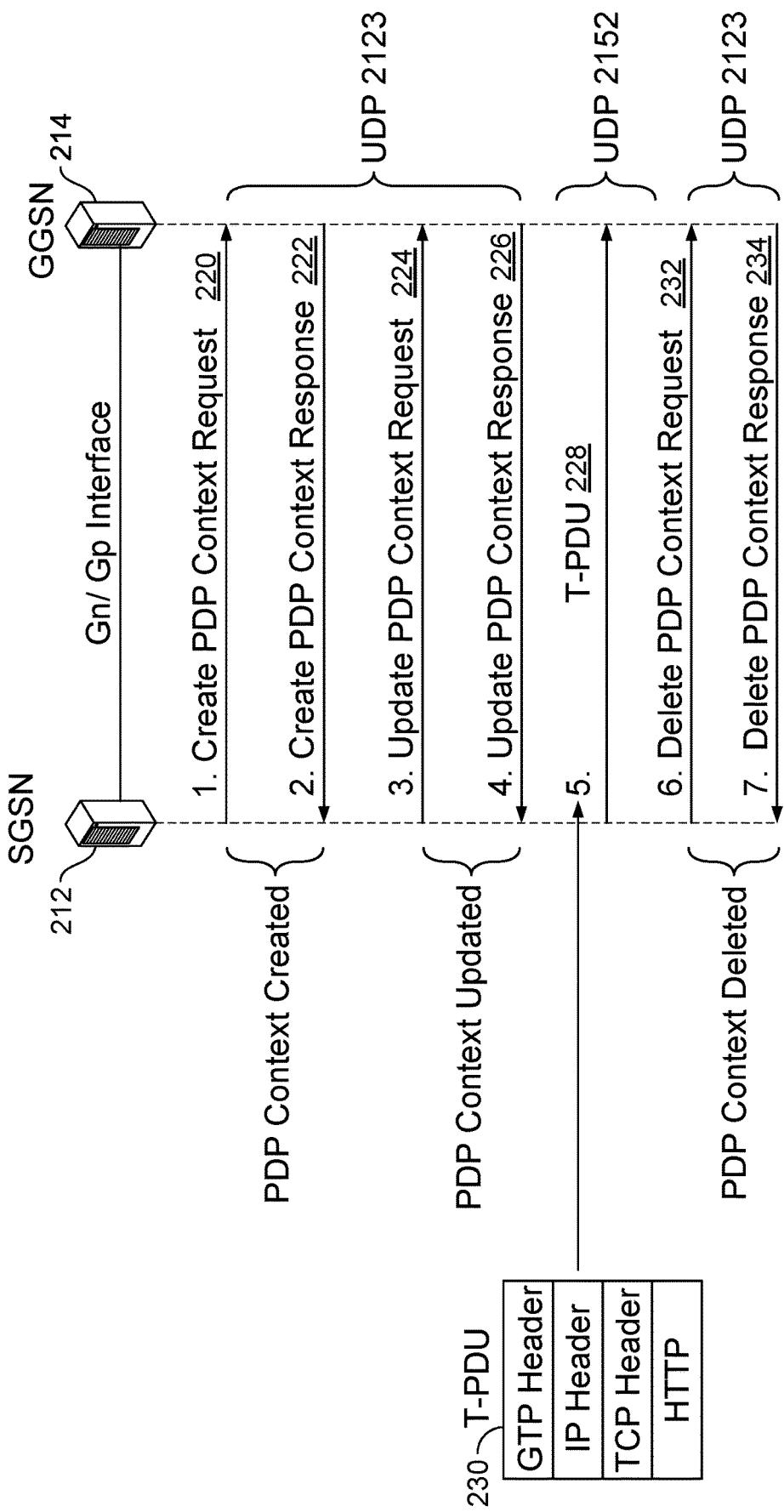
FIG. 2A is an example of GTPv1-C messages exchanged between an SGSN and a GGSN in a 3G network in accordance with some embodiments.

FIG. 2A is an example of GTPv1-C messages exchanged between an SGSN and a GGSN in a 3G network in accordance with some embodiments. Specifically, FIG. 2A shows GTPv1-C messages exchanged for activating, updating, and deactivating GTP sessions between an SGSN 212 and a GGSN 214 in a 3G network using a Gn/Gp interface. GTP is a standardized protocol that is based on the User Datagram Protocol (UDP).

Referring to FIG. 2A, a first message that is sent from SGSN 212 to GGSN 214 is a Create PDP Context Request message as shown at 220. The Create PDP Context Request message is a message to allocate a control and data channel for a new network communication access request for a mobile device in a 3G network (e.g., to be provided with a tunnel for user IP packets for network communications over a mobile service provider's network). For example, the Create PDP Context Request message can include location, hardware identity (e.g., IMEI), subscriber identity (e.g., IMSI), and/or radio access technology (RAT) information in the new network communication access request for the mobile device.

In one embodiment, the security platform monitors GTP-C messages in the mobile core to extract certain information included within GTP-C messages based on a security policy (e.g., monitoring GTPv1-C messages using a pass through firewall/NGFW that is located between the SGSN and GGSN in the mobile core such as shown in FIG. 1A and/or between various other elements/entities in the mobile core/EPC such as shown in FIG. 1B, or using a firewall/NGFW implemented as VM instances or agents executed on the SGSN, GGSN, SGW, PGW, and/or other entities in the mobile core network/EPC). For example, the security platform can monitor GTP-C messages and extract location, hardware identity (e.g., IMEI), subscriber identity (e.g., IMSI), and/or radio access technology (RAT) from the Create PDP Request message, such as further described below.

As shown in FIG. 2A, GGSN 214 sends a Create PDP Context Response message as shown at 222 to SGSN 212 to indicate whether the Create PDP Context Request is granted or not for the mobile device (e.g., whether to allow tunneled user data traffic in the mobile core network for the mobile device). The Create PDP Context Request and Create PDP Context Response messages sent using UDP communications on port 2123 are used for creating the PDP context as shown in FIG. 2A.

As also shown in FIG. 2A, an Update PDP Context Request message shown at 224 and an Update PDP Context Response message shown at 226 are exchanged between the SGSN and GGSN. For example, Update PDP Context Request/Response messages sent using UDP communications on port 2123 can be used to update one or more parameters for the connection/session.

Referring to FIG. 2A, in this example, the request for network communication access for the mobile device on the mobile service provider's network is allowed, and the SGSN sends a T-PDU message(s) shown at 228. For example, T-PDU message(s) can be used for mobile user network communication (e.g., IP packets) inside the tunnel (e.g., control/signaling messages are generally communicated on port 2123 using the GTP-C protocol, and user data messages are generally communicated on port 2152 using the GTP-U protocol). As shown at 230, T-PDU messages generally include a GTP Header, IP Header, TCP Header, and HTTP payload.

As also shown in FIG. 2A, the PDP context is deleted after completion of the user data session. Specifically, the PDP context is deleted after transfer of the user data is completed and the SGSN and GGSN exchange a Delete PDP Context Request message as shown at 232 and a Delete PDP Context Response message as shown at 234. The Delete PDP Context Request and Delete PDP Context Response messages sent using UDP communications on port 2123 are used for deleting the PDP context as also shown in FIG. 2A.

In one embodiment, the disclosed techniques perform inspection of signaling/control traffic in service provider networks, such as GTP-C traffic, and inspection of tunneled user traffic in service provider networks, such as GTP-U traffic (e.g., using a security platform, such as implemented using an NGFW that is capable of performing packet content inspection to identify an application ID, a user ID, a content ID, perform URL filtering, and/or other firewall/security policy for security/threat detection/prevention). In one embodiment, the disclosed techniques perform inspection of signaling/control traffic in service provider networks, such as GTP-C traffic, to extract information exchanged in the GTP-C traffic (e.g., parameters, such as location information associated with the subscriber/mobile device, device ID/IMEI, subscriber information/IMSI, and/or RAT, such as further described below). In one embodiment, the disclosed techniques perform inspection of signaling/control traffic in service provider networks, such as GTP-C traffic, to extract information exchanged in the GTP-C traffic (e.g., parameters, such as described above and further described below) as well as to monitor tunneled user traffic in service provider networks (e.g., using packet content inspection, such as described above and further described below).

In an example implementation, the security platform is configured to monitor the respective interfaces of the SGSN and GGSN to monitor control/signaling traffic (e.g., GTP-C messages) and tunneled user traffic (GTP-U) to implement a security platform with GTP monitoring capabilities that implements security policies, which can use, for example, location information associated with the subscriber/mobile device, device ID/IMEI, subscriber information/IMSI, and/or RAT, such as further described below that can be extracted from control/signaling traffic (e.g., GTP-C messages) as well as performing packet content inspection for IP packets inside the tunnel (e.g., T-PDU), as further described below. As described above, the location information/parameters, hardware identity (e.g., IMEI), subscriber identity (e.g., IMSI), and/or radio access technology (RAT), such as further described below, can be extracted from the Create PDP Request message by the security platform, which can be stored (e.g., cached as associated with the IP flow) for use in applying a security policy based on this extracted information and/or in combination with packet content inspection (e.g., including packet content inspection of SIGTRAN, SCTP, Diameter over SCTP, SCCP, CAP/MAP/INAP, and/or other signaling protocol traffic and/or various other network protocols used on service provider networks), such as further described below.

Figure 2B:
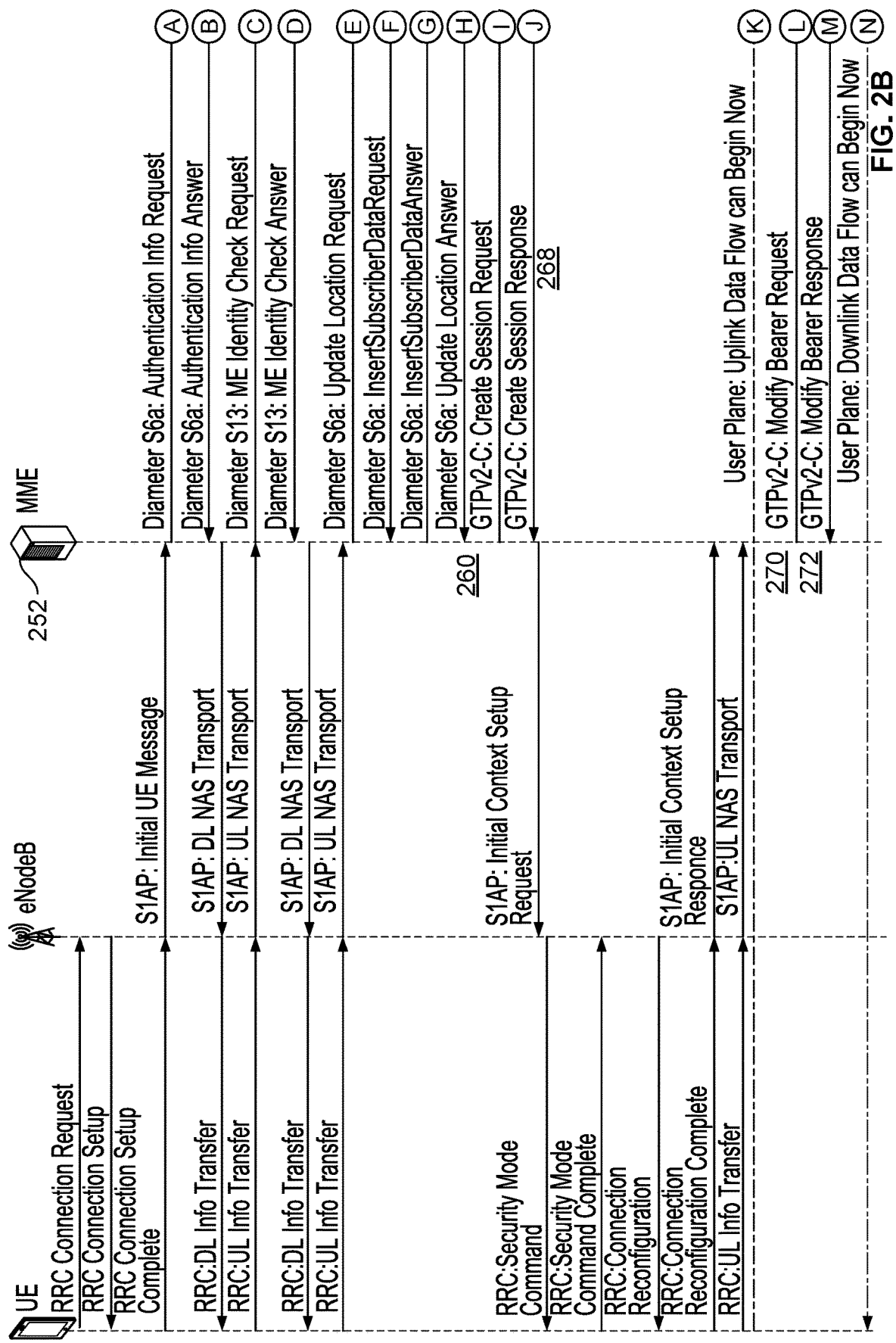
FIG. 2B is an example of GTPv2-C messages exchanged between entities including an MME, SGW, and a PGW in a 4G/LTE network in accordance with some embodiments.

FIG. 2B is an example of GTPv2-C messages exchanged between entities including an MME, SGW, and a PGW in a 4G/LTE network in accordance with some embodiments. Specifically, FIG. 2B shows GTPv2-C messages exchanged for an LTE Attach procedure with details of the GTPv2-C messages exchanged between an MME 252, SGW 254, and a PDN-GW (PGW) 256 (e.g., shown as a GGSN/PGW in FIG. 1B) in a 4G/LTE network. As discussed above, GTP is a standardized protocol that is based on the User Datagram Protocol (UDP).

Referring to FIG. 2B, various Diameter messages are sent from MME 252 to Home Subscriber Server (HSS) 258 and Equipment Identity Register (EIR) 274, as well as between PGW 256 and PCRF 276 as shown at 264. In one embodiment, various information/parameters, such as further described below, can be extracted from such Diameter messages/session traffic based on a security policy (e.g., monitoring Diameter messages using a pass through firewall/NGFW that is located between the MME, SGW, PGW, HSS, EIR, and/or PCRF or using a firewall/NGFW implemented as VM instances or agents executed on these entities, and/or other entities in the mobile core network), which can be stored (e.g., cached as associated with the IP flow) for use in applying a security policy based on this extracted/monitored information and/or in combination with packet content inspection of Diameter network protocol traffic, such as further described below.

As shown in FIG. 2B, a Create Session Request message is sent from MME 252 to SGW 254 as shown at 260 and then from SGW 254 to PGW 256 as shown at 262. The Create Session Request message is a message to allocate a control and data channel for a new network communication access request for a mobile device in a 4G/LTE network (e.g., to be provided with a tunnel for user IP packets for network communications over a mobile service provider's network). For example, the GTP Create Session Request message can include location, hardware identity (e.g., IMEI), subscriber identity (e.g., IMSI), and/or radio access technology (RAT) information in the new network communication access request for the mobile device.

In one embodiment, the security platform monitors GTP-C messages between the MME, SGW, and PGW to extract certain information included within GTP-C messages based on a security policy (e.g., monitoring GTPv2-C messages using a pass through firewall/NGFW that is located between the MME, SGW, and PGW or using a firewall/NGFW implemented as VM instances or agents executed on the MME, SGW, and PGW, and/or other entities in the mobile core network). For example, the security platform can monitor GTP-C messages and extract the location, hardware identity (e.g., IMEI), subscriber identity (e.g., IMSI), and/or radio access technology (RAT) from the Create Session Request message, such as further described below.

As shown in FIG. 2B, after session establishment as shown at 264, PGW 256 sends a Create Session Response message as shown at 266 to SGW 254 and then from SGW 254 to MME 252 as shown at 268 to indicate whether the Create Session Request is granted or not for the mobile device (e.g., whether to allow tunneled user data traffic in the mobile core network for the mobile device). The Create Session Request and Create Session Response messages sent using UDP communications on port 2123 are used for creating the initial setup context for the session as shown in FIG. 2B.

As also shown in FIG. 2B, a Modify Bearer Request message shown at 270 and a Modify Bearer Response message shown at 272 are exchanged between the MME, SGW, and PGW. For example, Modify Bearer Request/Response messages sent using UDP communications on port 2123 can be used to update one or more parameters for the connection/session.

In one embodiment, the disclosed techniques perform inspection of signaling/control traffic in service provider networks, such as GTP-C traffic, SIGTRAN, SCTP, Diameter over SCTP, SCCP, CAP/MAP/INAP, and/or other signaling protocol traffic, and inspection of tunneled user traffic in service provider networks, such as GTP-U various other network protocols used on service provider networks (e.g., using a security platform, such as implemented using an NGFW that is capable of performing packet content inspection to identify an application ID, a user ID, a content ID, perform URL filtering, and/or another firewall/security policy for security/threat detection/prevention). In one embodiment, the disclosed techniques perform inspection of signaling/control traffic in service provider networks, such as GTP-C traffic, to extract information exchanged in the GTP-C traffic (e.g., parameters, such as location information associated with the subscriber/mobile device, device ID/IMEI, subscriber information/IMSI, and/or RAT, such as further described below). In one embodiment, the disclosed techniques perform inspection of signaling/control traffic in service provider networks, such as GTP-C traffic, to extract information exchanged in the GTP-C traffic (e.g., parameters, such as described above and further described below) as well as to monitor tunneled user traffic in service provider networks (e.g., using packet content inspection, such as described above and further described below).

In an example implementation, the security platform is configured to monitor the respective interfaces of the MME, SGW, PGW, HSS, EIR, and PCRF to monitor control/signaling traffic (e.g., Diameter messages and GTP-C messages), tunneled user traffic (GTP-U), including packet content inspection of GTP, SIGTRAN, SCTP, Diameter over SCTP, SCCP, CAP/MAP/INAP, and/or other signaling protocol traffic and/or various other network protocols used on service provider networks to implement a security platform with GTP, SIGTRAN, SCTP, Diameter over SCTP, SCCP, CAP/MAP/INAP, and/or other signaling protocol traffic and/or various other network traffic monitoring capabilities that implement security policies, which can use, for example, parameters, such as location information associated with the subscriber/mobile device, device ID/IMEI, subscriber information/IMSI, and/or RAT, and/or any other parameters/information that can be extracted from control/signaling traffic (e.g., GTP-C messages and/or types of messages) as well as performing packet content inspection for IP packets inside the tunnel and packet content inspection packet content inspection of SIGTRAN, SCTP, Diameter over SCTP, SCCP, CAP/MAP/INAP, and/or other signaling protocol traffic and/or various other network protocols used on service provider networks, as further described below. As described above, the location information/parameters, hardware identity (e.g., IMEI), subscriber identity (e.g., IMSI), and/or radio access technology (RAT) can be extracted from the Create Session Request message by the security platform, which can be stored (e.g., cached as associated with the IP flow) for use in applying a security policy based on this extracted information and/or in combination with packet content inspection, such as further described below.

The disclosed techniques are illustrated and generally described herein with respect to performing network traffic inspection of GTPv1-C and GTP-U, SIGTRAN, SCTP, Diameter over SCTP, SCCP, CAP/MAP/INAP, and/or other signaling protocol traffic and/or various other network protocols used on service provider networks in a 3G Mobile Packet Core (MPC) and in a 4G Evolved Packet Core (EPC) using the GTPv2-C and GTP-U protocols, SIGTRAN, SCTP, Diameter over SCTP, SCCP, CAP/MAP/INAP, and/or other signaling protocol traffic and/or various other network protocols used on service provider networks and/or can be similarly implemented in other mobile core networks/using other mobile network protocols (e.g., such as for 5G core networks or other mobile networks/protocol) that include location, device, subscriber, and/or RAT parameters/information (e.g., location information, hardware identity, subscriber identifier information, RAT type information and/or other user/device/network specific parameters in the respective protocols) and/or tunneled user traffic on service provider networks for mobile device communications.

Figure 3A:
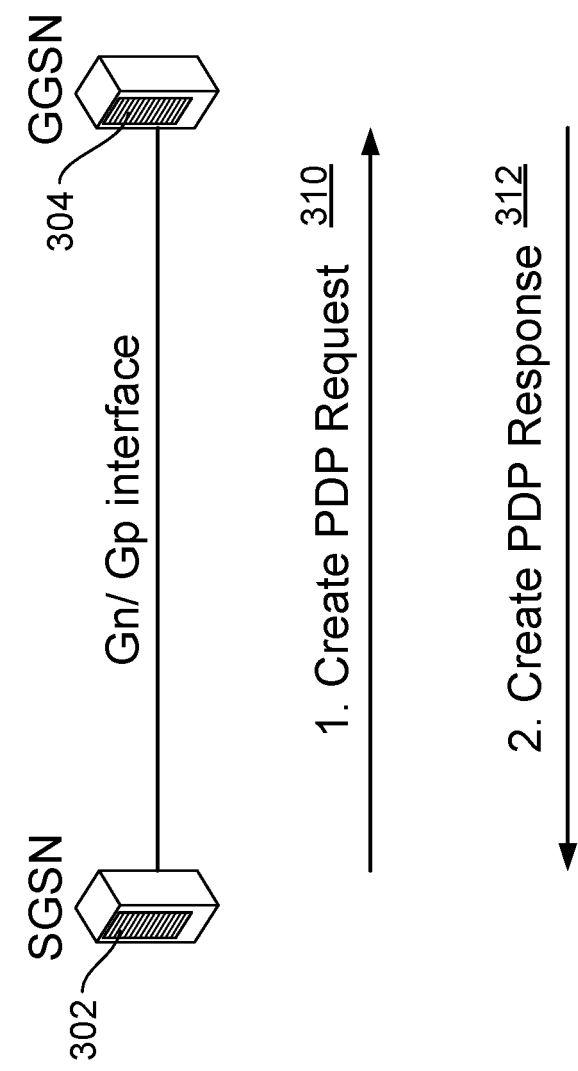
FIG. 3A is another example of a GTPv1-C message flow between an SGSN and a GGSN in a 3G network in accordance with some embodiments.

FIG. 3A is another example of a GTPv1-C message flow between an SGSN and a GGSN in a 3G network in accordance with some embodiments. Specifically, FIG. 3A shows GTPv1-C messages exchanged for a GTPv1-C Create PDP Message flow between an SGSN 302 and a GGSN 304 in a 3G network.

Referring to FIG. 3A, a Create PDP Request message is sent from SGSN 302 to GGSN 304 using the Gn/Gp interface as shown at 310. A Create PDP Response message is sent from GGSN 304 to SGSN 302 using the Gn/Gp interface as shown at 312.

Figure 3B:
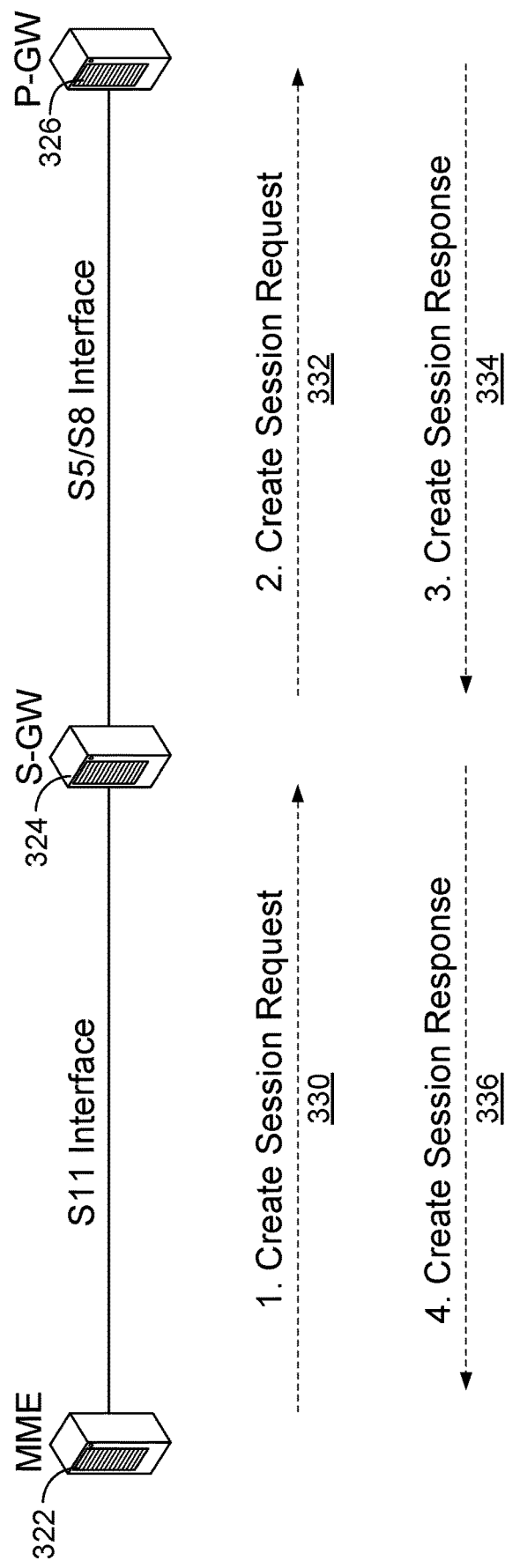
FIG. 3B is another example of a GTPv2-C message flow between an MME, SGW, and a PGW in a 4G/LTE network in accordance with some embodiments.

FIG. 3B is another example of a GTPv2-C message flow between an MME, SGW, and a PGW in a 4G/LTE network in accordance with some embodiments. Specifically, FIG. 3B shows GTPv2-C messages exchanged for a GTPv2-C Create Session Message flow between an MME 322, SGW 324, and a PDN-GW (PGW) 326 (e.g., shown as a GGSN/PGW in FIG. 1B) in a 4G/LTE network.

Referring to FIG. 3B, a Create Session Request message is sent from MME 322 to SGW 324 using the S11 interface as shown at 330 and then from SGW 324 to PGW 326 using the S5/S8 interface as shown at 332. A Create Session Response message is sent from PGW 326 to SGW 324 using the S5/S8 interface as shown at 334 and then from SGW 324 to MME 322 using the S11 interface as shown at 336.

As will now be further described below, various information/parameters, such as location, hardware identity (e.g., IMEI), subscriber identity (e.g., IMSI), and/or radio access technology (RAT) can be extracted from the control/signaling traffic (e.g., GTPv1-C Create PDP Request messages, GTPv2-C Create Session Request messages, and/or other control/signaling protocols/messages in a mobile core network) monitored by the security platform, which can be stored (e.g., cached as associated with the IP flow) for use in applying a security policy based on this extracted information and/or in combination with packet content inspection performed by the security platform on tunneled user data traffic (e.g., GTP-U traffic and/or other tunneled user data protocols in a mobile core network).

Techniques for Transport Layer Signaling Security with Next Generation Firewall in Mobile Networks for Service Providers In one embodiment, the disclosed techniques for enhanced security in mobile networks for service providers include providing transport layer signaling security (e.g., for the SIGTRAN protocol) in mobile networks for service providers. For example, mobile service providers (e.g., service providers of mobile networks, service providers of mobile devices or IoTs, security service providers, or other entities that provide devices/services associated with using mobile networks) and Mobile Virtual Network Operator (MVNO) providers can apply the disclosed techniques to provide transport layer signaling based security to user devices (e.g., mobile devices of subscribers) and/or IoT devices that connect to their mobile network using 3G, 4G, or 5G Radio Access Technology (RAT).

For example, mobile service providers (e.g., service providers of mobile networks, service providers of mobile devices or IoTs, security service providers, or other entities that provide devices/services associated with using mobile networks) and MVNO providers can apply the disclosed techniques to apply application layer signaling based security to their network elements in a 3G Mobile Packet Core (MPC), in a 4G Evolved Packet Core (EPC), and/or in other mobile core networks (e.g., such as for 5G core networks).

As another example, Internet Private Exchange (IPX) providers and GPRS Roaming Exchange (GRX) providers can apply the disclosed techniques to provide application layer signaling based security to mobile service providers (e.g., service providers of mobile networks, service providers of mobile devices or IoTs, security service providers, or other entities that provide devices/services associated with using mobile networks) that take network interconnection services from them for 3G, 4G, and/or 5G technologies.

As yet another example mobile service providers (e.g., service providers of mobile networks, service providers of mobile devices or IoTs, security service providers, or other entities that provide devices/services associated with using mobile networks) can apply the disclosed techniques to provide application layer signaling based security to another mobile service providers (e.g., MVNO providers, service providers of mobile devices or IoT, security service providers, or other entities that provide devices/services associated with using mobile networks) that take network connectivity services from them for 3G, 4G, and/or 5G technologies.

In one embodiment, mobile service providers can apply the disclosed techniques to provide new and enhanced transport layer signaling security in mobile networks for service providers. For example, mobile service providers can apply the disclosed techniques to provide a transport layer signaling based security service. As another example, mobile service providers can apply the disclosed techniques to provide a transport layer signaling based threat detection service (e.g., a transport layer signaling based, basic threat detection service for known threats, a transport layer signaling based, advanced threat detection service for unknown threats, and/or other threat detection services that can utilize transport layer signaling based information to apply security policies). As yet another example, mobile service providers can apply the disclosed techniques to provide a transport layer signaling based threat prevention service for known threats (e.g., a transport layer signaling based, basic threat prevention service for known threats, a transport layer signaling based, advanced threat prevention service for unknown threats, and/or other threat prevention services that can utilize transport layer signaling based information to apply security policies).

Accordingly, the disclosed techniques for enhanced security in mobile networks for service providers include performing transport layer signaling based security and similarly for higher layers of signaling traffic in mobile networks using a security platform that can implement security policies based on filtered transport layer signaling information/messages or higher layer signaling information/messages (e.g., application signaling layers).

As will now be apparent to those of ordinary skill in the art, mobile service providers (e.g., service providers of mobile networks, service providers of mobile devices or IoTs, security service providers, or other entities that provide devices/services associated with using mobile networks) can provide each of these transport layer signaling based security services or combinations thereof as well as various other signaling layers based security services using the disclosed techniques. Also, mobile service providers can apply the disclosed techniques to provide such transport layer signaling based security services in combination with various other enhanced security services, such as subscriber/user identity based, hardware identity based, RAT based, and/or combinations thereof, as further described below.

These and other techniques for providing enhanced security in mobile networks for service providers based on transport layer signaling information/messages (e.g., and/or in combination with other packet content inspection and/or NGFW techniques, such as Application-ID, user ID, content ID, URL filtering, etc.) will be further described below.

Techniques for Application Layer Signaling Security with Next Generation Firewall in Mobile Networks for Service Providers In one embodiment, the disclosed techniques for enhanced security in mobile networks for service providers include providing application layer signaling security (e.g., for CAP, MAP, INAP, and/or other layer-7/application layer signaling protocols) in mobile networks for service providers. For example, mobile service providers (e.g., service providers of mobile networks, service providers of mobile devices or IoTs, security service providers, or other entities that provide devices/services associated with using mobile networks) and MVNO providers can apply the disclosed techniques to provide application layer signaling based security to user devices (e.g., mobile devices of subscribers) and/or IoT devices that connect to their mobile network using 3G, 4G, or 5G Radio Access Technology (RAT).

For example, mobile service providers (e.g., service providers of mobile networks, service providers of mobile devices or IoTs, security service providers, or other entities that provide devices/services associated with using mobile networks) and MVNO providers can apply the disclosed techniques to apply application layer signaling based security to their network elements in a 3G Mobile Packet Core (MPC), in a 4G Evolved Packet Core (EPC), and/or in other mobile core networks (e.g., such as for 5G core networks).

As another example, Internet Private Exchange (IPX) providers and GPRS Roaming Exchange (GRX) providers can apply the disclosed techniques to provide application layer signaling based security to mobile service providers (e.g., service providers of mobile networks, service providers of mobile devices or IoTs, security service providers, or other entities that provide devices/services associated with using mobile networks) that take network interconnection services from them for 3G, 4G, and/or 5G technologies.

As yet another example mobile service providers (e.g., service providers of mobile networks, service providers of mobile devices or IoTs, security service providers, or other entities that provide devices/services associated with using mobile networks) can apply the disclosed techniques to provide application layer signaling based security to another mobile service providers (e.g., MVNO providers, service providers of mobile devices or IoT, security service providers, or other entities that provide devices/services associated with using mobile networks) that take network connectivity services from them for 3G, 4G, and/or 5G technologies.

In one embodiment, mobile service providers can apply the disclosed techniques to provide new and enhanced application layer signaling security in mobile networks for service providers. For example, mobile service providers can apply the disclosed techniques to provide an application layer signaling based security service. As another example, mobile service providers can apply the disclosed techniques to provide an application layer signaling based threat detection service (e.g., an application layer signaling based, basic threat detection service for known threats, an application layer signaling based, advanced threat detection service for unknown threats, and/or other threat detection services that can utilize application layer signaling based information to apply security policies). As yet another example, mobile service providers can apply the disclosed techniques to provide an application layer signaling based threat prevention service for known threats (e.g., an application layer signaling based, basic threat prevention service for known threats, an application layer signaling based, advanced threat prevention service for unknown threats, and/or other threat prevention services that can utilize application layer signaling based information to apply security policies).

Accordingly, the disclosed techniques for enhanced security in mobile networks for service providers include performing application layer signaling based security in mobile networks using a security platform that can implement security policies based on filtered application layer signaling information/messages or lower layer signaling information/messages (e.g., transport and network signaling layers).

As will now be apparent to those of ordinary skill in the art, mobile service providers (e.g., service providers of mobile networks, service providers of mobile devices or IoTs, security service providers, or other entities that provide devices/services associated with using mobile networks) can provide each of these application layer signaling based security services or combinations thereof as well as various other signaling layers based security services using the disclosed techniques. Also, mobile service providers can apply the disclosed techniques to provide such application layer signaling based security services in combination with various other enhanced security services, such as subscriber/user identity based, hardware identity based, RAT based, and/or combinations thereof, as further described below.

These and other techniques for providing enhanced security in mobile networks for service providers based on application layer signaling information/messages (e.g., and/or in combination with other packet content inspection and/or NGFW techniques, such as Application-ID, user ID, content ID, URL filtering, etc.) will be further described below.

Techniques for Network Layer Signaling Security with Next Generation Firewall in Mobile Networks for Service Providers In one embodiment, the disclosed techniques for enhanced security in mobile networks for service providers include providing network layer signaling security in mobile networks for service providers. For example, mobile service providers (e.g., service providers of mobile networks, service providers of mobile devices or IoTs, security service providers, or other entities that provide devices/services associated with using mobile networks) and MVNO providers can apply the disclosed techniques to provide SCCP-based security to user devices (e.g., mobile devices of subscribers) and/or IoT devices that connect to their mobile network using 3G, 4G, or 5G Radio Access Technology (RAT).

For example, mobile service providers (e.g., service providers of mobile networks, service providers of mobile devices or IoTs, security service providers, or other entities that provide devices/services associated with using mobile networks) and MVNO providers can apply the disclosed techniques to apply application layer signaling based security to their network elements in a 3G Mobile Packet Core (MPC), in a 4G Evolved Packet Core (EPC), and/or in other mobile core networks (e.g., such as for 5G core networks).

As another example, Internet Private Exchange (IPX) providers and GPRS Roaming Exchange (GRX) providers can apply the disclosed techniques to provide application layer signaling based security to mobile service providers (e.g., service providers of mobile networks, service providers of mobile devices or IoTs, security service providers, or other entities that provide devices/services associated with using mobile networks) that take network interconnection services from them for 3G, 4G, and/or 5G technologies.

As yet another example mobile service providers (e.g., service providers of mobile networks, service providers of mobile devices or IoTs, security service providers, or other entities that provide devices/services associated with using mobile networks) can apply the disclosed techniques to provide application layer signaling based security to another mobile service providers (e.g., MVNO providers, service providers of mobile devices or IoT, security service providers, or other entities that provide devices/services associated with using mobile networks) that take network connectivity services from them for 3G, 4G, and/or 5G technologies.

In one embodiment, mobile service providers can apply the disclosed techniques to provide new and enhanced network layer signaling security in mobile networks for service providers. For example, mobile service providers can apply the disclosed techniques to provide network layer signaling based security service. As another example, mobile service providers can apply the disclosed techniques to provide network layer signaling based threat detection service (e.g., an SCCP-based, basic threat detection service for known threats, a network layer signaling based, advanced threat detection service for unknown threats, and/or other threat detection services that can utilize SCCP-based information to apply security policies). As yet another example, mobile service providers can apply the disclosed techniques to provide a network layer signaling based threat prevention service for known threats (e.g., an SCCP-based, basic threat prevention service for known threats, an SCCP-based, advanced threat SCCP service for unknown threats, and/or other threat prevention services that can utilize SCCP-based information to apply security policies).

Accordingly, the disclosed techniques for enhanced security in mobile networks for service providers include performing network layer signaling based security in mobile networks using a security platform that can implement security policies based on filtered network layer signaling information/messages (e.g., SCCP information/messages) or lower/higher layer signaling information/messages.

As will now be apparent to those of ordinary skill in the art, mobile service providers (e.g., service providers of mobile networks, service providers of mobile devices or IoTs, security service providers, or other entities that provide devices/services associated with using mobile networks) can provide each of these network layer signaling based security services or combinations thereof as well as various other signaling layers based security services using the disclosed techniques. Also, mobile service providers can apply the disclosed techniques to provide such network layer signaling based security services in combination with various other enhanced security services, such as subscriber/user identity based, hardware identity based, RAT based, and/or combinations thereof, as further described below.

These and other techniques for providing enhanced security in mobile networks for service providers based on network layer signaling information/messages (e.g., and/or in combination with other packet content inspection and/or NGFW techniques, such as Application-ID, user ID, content ID, URL filtering, etc.) will be further described below.

Techniques for Diameter over SCTP Security with Next Generation Firewall in Mobile Networks for Service Providers In one embodiment, the disclosed techniques for enhanced security in mobile networks for service providers include techniques for Diameter over SCTP security with next generation firewall in mobile networks for service providers. For example, mobile service providers and MVNO providers can apply the disclosed techniques to provide Diameter over SCTP security (e.g., in combination with Application-ID using an NGFW) to user devices that connect to their mobile network via 3G, 4G, or 5G networks.

For example, mobile service providers (e.g., service providers of mobile networks, service providers of mobile devices or IoTs, security service providers, or other entities that provide devices/services associated with using mobile networks) and MVNO providers can apply the disclosed techniques to apply application layer signaling based security to their network elements in a 3G Mobile Packet Core (MPC), in a 4G Evolved Packet Core (EPC), and/or in other mobile core networks (e.g., such as for 5G core networks).

As another example, Internet Private Exchange (IPX) providers and GPRS Roaming Exchange (GRX) providers can apply the disclosed techniques to provide application layer signaling based security to mobile service providers (e.g., service providers of mobile networks, service providers of mobile devices or IoTs, security service providers, or other entities that provide devices/services associated with using mobile networks) that take network interconnection services from them for 3G, 4G, and/or 5G technologies.

As yet another example mobile service providers (e.g., service providers of mobile networks, service providers of mobile devices or IoTs, security service providers, or other entities that provide devices/services associated with using mobile networks) can apply the disclosed techniques to provide application layer signaling based security to another mobile service providers (e.g., MVNO providers, service providers of mobile devices or IoT, security service providers, or other entities that provide devices/services associated with using mobile networks) that take network connectivity services from them for 3G, 4G, and/or 5G technologies.

In one embodiment, the disclosed techniques for enhanced security in mobile networks for service providers include providing Diameter over SCTP security in mobile networks for service providers. For example, mobile service providers can apply the disclosed techniques to provide Diameter over SCTP security services to user devices (e.g., mobile devices of subscribers) and/or IoT devices that connect to their mobile network.

In one embodiment, mobile service providers can apply the disclosed techniques to provide new and enhanced Diameter over SCTP security services. For example, mobile service providers can apply the disclosed techniques to provide a Diameter over SCTP based security service. As another example, mobile service providers can apply the disclosed techniques to provide a threat detection service using information extracted from Diameter over SCTP (e.g., a Diameter over SCTP based, basic threat detection service for known threats, a Diameter over SCTP-based, advanced threat detection service for unknown threats, and/or other threat detection services that can utilize Diameter over SCTP decoded/extracted information to apply security policies). As yet another example, mobile service providers can apply the disclosed techniques to provide a threat prevention service for known threats using information extracted from Diameter over SCTP (e.g., a Diameter over SCTP-based, basic threat prevention service for known threats, a Diameter over SCTP-based, advanced threat prevention service for unknown threats, and/or other threat prevention services that can utilize Diameter over SCTP decoded/extracted information to apply security policies).

In one embodiment, the disclosed techniques for enhanced security in mobile networks for service providers include performing Diameter over SCTP-based security in mobile networks using a security platform that can implement security policies based on Diameter over SCTP decoded/extracted information. For example, a security platform can monitor Diameter over SCTP traffic in a mobile network and process (e.g., parse) the protocol/payloads to extract various information.

Figure 4A:
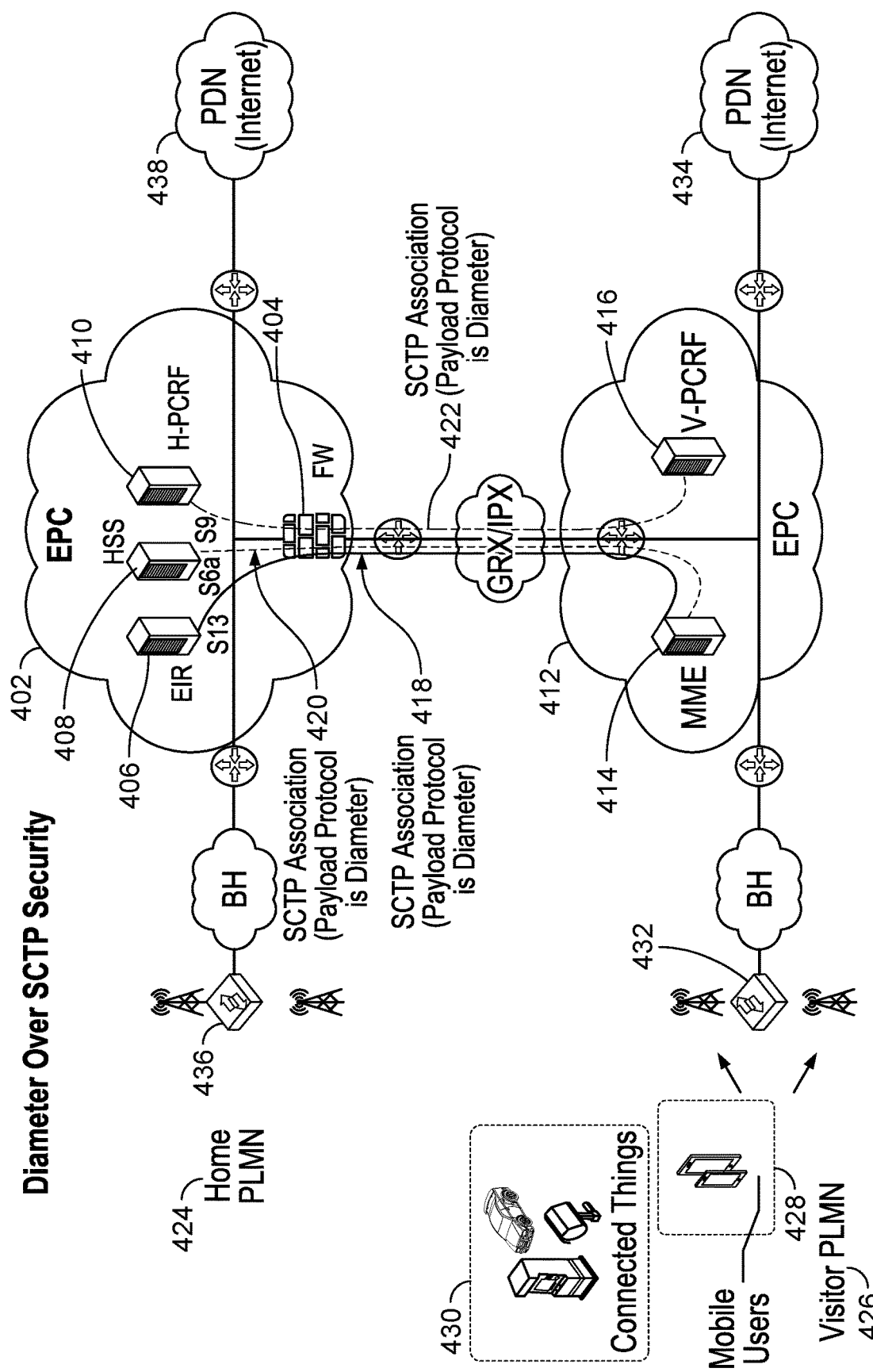
FIG. 4A is a block diagram of a 4G/LTE wireless network with a security platform for providing Diameter over SCTP security with next generation firewall in mobile networks for service providers in accordance with some embodiments.

Example System Architectures for Implementing Enhanced Signaling Security in Mobile Networks for Service Providers FIG. 4A is a block diagram of a 4G/LTE wireless network with a security platform for providing Diameter over SCTP security with next generation firewall in mobile networks for service providers in accordance with some embodiments. FIG. 4A is an example service provider network environment for a 4G/LTE EPC network architecture that includes a 4G/LTE network (e.g., and can also include Wired, Wi-Fi, 3G, 5G, and/or other networks) to facilitate data communications for subscribers over the Internet and/or other networks. As shown in FIG. 4A, a Home Public Land Mobile Network (PLMN) 424 is in communication with a Radio Access Network (RAN) 436 which is in communication via a backhaul (BH) network with an Evolved Packet Core (EPC) network 402 to facilitate access to a Packet Data Network (PDN) 438 (e.g., the Internet). As also shown, a Visitor PLMN 426 is in communication with a RAN 432 which is in communication via a BH network with an EPC network 412 to facilitate access to a PDN 434 (e.g., the Internet). As shown, various User Equipment (UE), such as mobile user devices 428 (e.g., mobile phones, tablets, watches, laptops, and/or other computing devices) and connected things 430 (e.g., various IoT devices), can communicate using various cells in RAN 432.

FIG. 4A shows a network placement of a security platform, shown as a FW 404 (e.g., an NGFW or other security platform as similarly described above), in EPC 402 for monitoring and decoding Diameter over SCTP traffic between EPC 402 and EPC 412. Specifically, FW 404 monitors Diameter over SCTP traffic between a Mobile Management Entity (MME) 414 and an Equipment Identity Register (EIR) 406 (e.g., via the S13 interface) to facilitate SCTP association and inspect the Diameter payload as shown at 418, and also monitors Diameter over SCTP traffic between MME 414 and Home Subscriber Server (HSS) 408 (e.g., via the S6a interface) to facilitate SCTP association and inspect the Diameter payload as shown at 420. Similarly, FW 404 monitors Diameter over SCTP traffic between Visitor Policy Control and Charging Rules Function (V-PCRF) 416 and Home Policy Control and Charging Rules Function (H-PCRF) 410 (e.g., via the S9 interface) to facilitate SCTP association and inspect the Diameter payload as shown at 422.

For example, various security policies can be enforced by FW 404 based on parameters/information extracted from such Diameter over SCTP traffic using the disclosed techniques (e.g., roaming subscribers generally can have a distinct security policy enforced that is different than a security policy enforced for non-roaming subscribers to facilitate enhanced roaming security on service provider networks). In an example implementation, roaming subscribers may have access restricted based on Application-ID (and/or other packet content inspection determined information, such as Content-ID, User-ID, URL, etc.), and/or various other security policies can be enforced.

As will now be apparent to those of ordinary skill in the art, mobile service providers (e.g., service providers of mobile networks, service providers of mobile devices or IoTs, security service providers, or other entities that provide devices/services associated with using mobile networks) and MVNO providers can provide each of these Diameter over SCTP-based security services or combinations thereof as well as various other Diameter over SCTP-based services using the disclosed techniques. Also, mobile service providers can apply the disclosed techniques to provide such using Diameter over SCTP-based security services in combination with various other enhanced security services, such as location based, mobile device identifier based, mobile user identifier based, and/or combinations thereof, as further described below.

These and other techniques for providing Diameter over SCTP security with next generation firewall in mobile networks for service providers (e.g., using various packet content inspection and/or NGFW techniques, such as Application-ID, user ID, content ID, URL filtering, etc.) will be further described below.

Figure 4B:
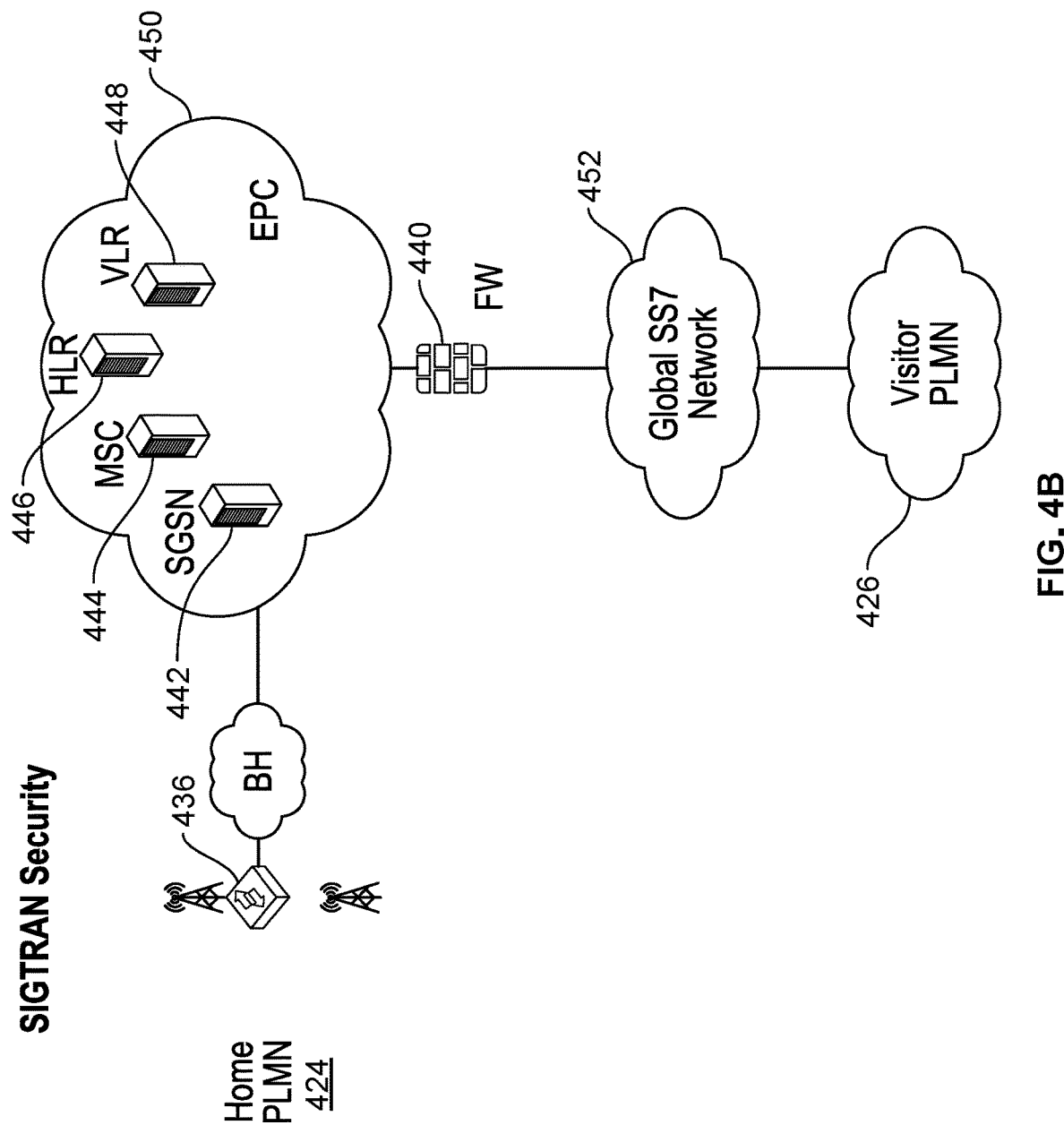
FIG. 4B is a block diagram of a 4G/LTE wireless network with a security platform for providing SIGTRAN security with next generation firewall in mobile networks for service providers in accordance with some embodiments.

FIG. 4B is a block diagram of a 4G/LTE wireless network with a security platform for providing SIGTRAN security with next generation firewall in mobile networks for service providers in accordance with some embodiments. FIG. 4B is an example service provider network environment for a 4G/LTE EPC network architecture that includes a 4G/LTE network (e.g., and can also include Wired, Wi-Fi, 3G, 5G, and/or other networks) to facilitate data communications for subscribers over the Internet and/or other networks. As shown in FIG. 4B, a Home PLMN 424 is in communication with a RAN 436 which is in communication via a BH network with a mobile core network, shown as an EPC 450, that includes a Serving GPRS Support Node (SGSN) 442, a Mobile Switching Center (MSC) 444, a Home Location Register (HLR) 446, and a Visitor Location Register (VLR) 448. As also shown, a Visitor PLMN 426 is in communication with a Global Signaling System No. 7 (SS7) network 452 which is in communication with the mobile core network. As will be apparent to one of ordinary skill in the art, various UE, such as mobile user devices (e.g., mobile phones, tablets, watches, laptops, and/or other computing devices) and connected things (e.g., various IoT devices), can communicate via Home PLMN 424 (e.g., using various cells in RAN 436) or similarly via Visitor PLMN 426.

FIG. 4B shows a network placement of a security platform, shown as a FW 440 (e.g., a NGFW or other security platform as similarly described above), between EPC 450 and Global SS7 Network 452 for monitoring and decoding SIGTRAN traffic between EPC 450 and Global SS7 Network 452.

For example, various security policies can be enforced by FW 440 based on parameters/information extracted from such SIGTRAN traffic using the disclosed techniques (e.g., roaming subscribers generally can have a distinct security policy enforced that is different than a security policy enforced for non-roaming subscribers). In an example implementation, roaming subscribers may have access restricted based on Application-ID (and/or other packet content inspection determined information, such as Content-ID, User-ID, URL, etc.), and/or various other security policies can be enforced.

As will now be apparent to those of ordinary skill in the art, mobile service providers (e.g., service providers of mobile networks, service providers of mobile devices or IoTs, security service providers, or other entities that provide devices/services associated with using mobile networks) and MVNO providers can provide each of these SIGTRAN based security services or combinations thereof as well as various other SIGTRAN based services using the disclosed techniques. Also, mobile service providers can apply the disclosed techniques to provide such using SIGTRAN based security services in combination with various other enhanced security services, such as location based, mobile device identifier based, and mobile user identifier based, and/or combinations thereof, as further described below.

These and other techniques for providing SIGTRAN security with next generation firewall in mobile networks for service providers (e.g., using various packet content inspection and/or NGFW techniques, such as Application-ID, user ID, content ID, URL filtering, etc.) will be further described below.

Figure 4C:
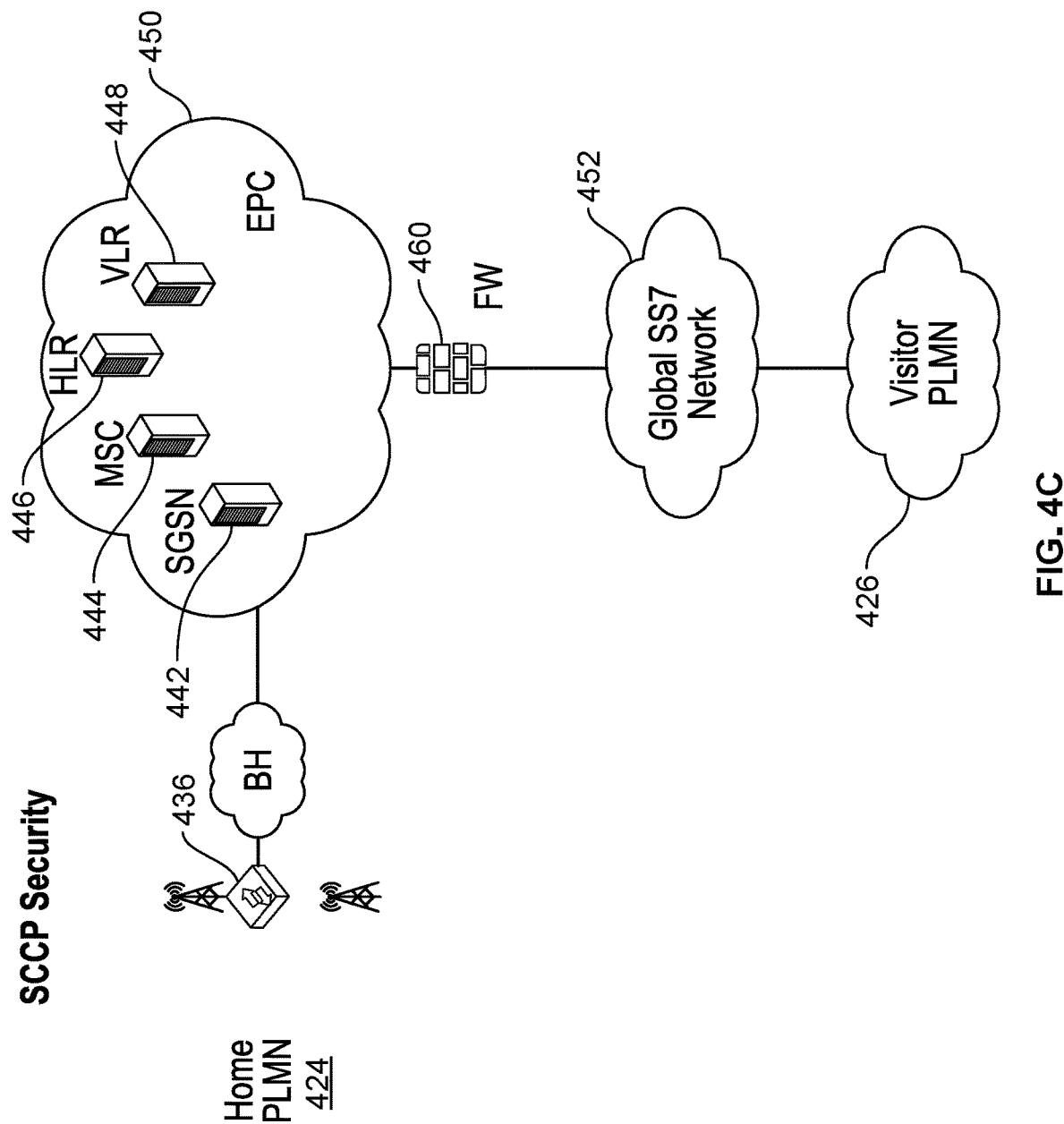
FIG. 4C is a block diagram of a 4G/LTE wireless network with a security platform for providing SCCP security with next generation firewall in mobile networks for service providers in accordance with some embodiments.

FIG. 4C is a block diagram of a 4G/LTE wireless network with a security platform for providing SCCP security with next generation firewall in mobile networks for service providers in accordance with some embodiments. FIG. 4C is an example service provider network environment for a 4G/LTE EPC network architecture that includes a 4G/LTE network (e.g., and can also include Wired, Wi-Fi, 3G, 5G, and/or other networks) to facilitate data communications for subscribers over the Internet and/or other networks. As shown in FIG. 4C, a Home PLMN 424 is in communication with a RAN 436 which is in communication via a BH network with a mobile core network, shown as an EPC 450, that includes an SGSN 442, an MSC 444, an HLR 446, and a VLR 448. As also shown, a Visitor PLMN 426 is in communication with a Global SS7 network 452 which is in communication with the mobile core network. As will be apparent to one of ordinary skill in the art, various UE, such as mobile user devices (e.g., mobile phones, tablets, watches, laptops, and/or other computing devices) and connected things (e.g., various IoT devices), can communicate via Home PLMN 424 (e.g., using various cells in RAN 436) or similarly via Visitor PLMN 426.

FIG. 4C shows a network placement of a security platform, shown as an FW 460 (e.g., an NGFW or other security platform as similarly described above), between EPC 450 and Global SS7 Network 452 for monitoring and decoding SCCP traffic between EPC 450 and Global SS7 Network 452.

For example, various security policies can be enforced by FW 460 based on parameters/information extracted from such SCCP traffic using the disclosed techniques (e.g., roaming subscribers generally can have a distinct security policy enforced that is different than a security policy enforced for non-roaming subscribers). In an example implementation, roaming subscribers may have access restricted based on Application-ID (and/or other packet content inspection determined information, such as Content-ID, User-ID, URL, etc.), and/or various other security policies can be enforced.

As will now be apparent to those of ordinary skill in the art, mobile service providers (e.g., service providers of mobile networks, service providers of mobile devices or IoTs, security service providers, or other entities that provide devices/services associated with using mobile networks) and MVNO providers can provide each of these SCCP-based security services or combinations thereof as well as various other SCCP-based services using the disclosed techniques. Also, mobile service providers can apply the disclosed techniques to provide such using SCCP-based security services in combination with various other enhanced security services, such as location based, mobile device identifier based, and mobile user identifier based, and/or combinations thereof, as further described below.

These and other techniques for providing SCCP security with next generation firewall in mobile networks for service providers (e.g., using various packet content inspection and/or NGFW techniques, such as Application-ID, user ID, content ID, URL filtering, etc.) will be further described below.

Figure 4D:
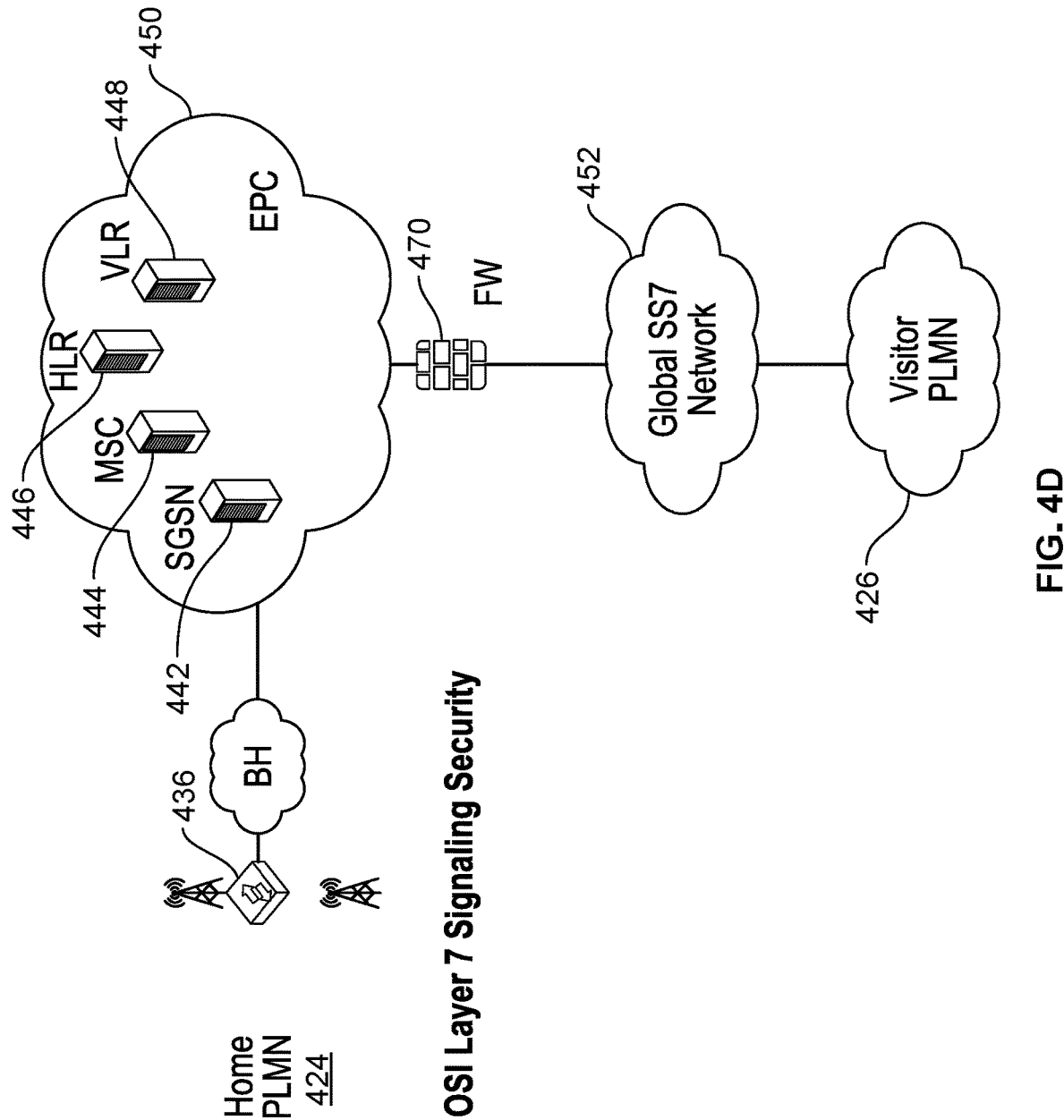
FIG. 4D is a block diagram of a 4G/LTE wireless network with a security platform for providing OSI layer 7 signaling security with next generation firewall in mobile networks for service providers in accordance with some embodiments.

FIG. 4D is a block diagram of a 4G/LTE wireless network with a security platform for providing OSI layer 7 signaling security with next generation firewall in mobile networks for service providers in accordance with some embodiments. FIG. 4D is an example service provider network environment for a 4G/LTE EPC network architecture that includes a 4G/LTE network (e.g., and can also include Wired, Wi-Fi, 3G, 5G, and/or other networks) to facilitate data communications for subscribers over the Internet and/or other networks. As shown in FIG. 4D, a Home PLMN 424 is in communication with a RAN 436 which is in communication via a BH network with a mobile core network, shown as an EPC 450 that includes an SGSN 442, an MSC 444, an HLR 446, and a VLR 448. As also shown, a Visitor PLMN 426 is in communication with a Global SS7 network 452 which is in communication with the mobile core network. As will be apparent to one of ordinary skill in the art, various UE, such as mobile user devices (e.g., mobile phones, tablets, watches, laptops, and/or other computing devices) and connected things (e.g., various IoT devices), can communicate via Home PLMN 424 (e.g., using various cells in RAN 436) or similarly via Visitor PLMN 426.

FIG. 4D shows a network placement of a security platform, shown as a FW 470 (e.g., an NGFW or other security platform as similarly described above), between EPC 450 and Global SS7 Network 452 for monitoring and decoding OSI layer 7 signaling traffic (e.g., CAP/MAP/INAP or other OSI layer 7 signaling traffic) between EPC 450 and Global SS7 Network 452.

For example, various security policies can be enforced by FW 470 based on parameters/information extracted from such OSI layer 7 signaling traffic (e.g., CAP/MAP/INAP or other OSI layer 7 signaling traffic) using the disclosed techniques (e.g., roaming subscribers generally can have a distinct security policy enforced that is different than a security policy enforced for non-roaming subscribers). In an example implementation, roaming subscribers may have access restricted based on Application-ID (and/or other packet content inspection determined information, such as Content-ID, User-ID, URL, etc.), and/or various other security policies can be enforced.

As will now be apparent to those of ordinary skill in the art, mobile service providers (e.g., service providers of mobile networks, service providers of mobile devices or IoTs, security service providers, or other entities that provide devices/services associated with using mobile networks) can provide each of these OSI layer 7 signaling (e.g., CAP/MAP/INAP or other OSI layer 7 signaling traffic) based security services or combinations thereof as well as various other OSI layer 7 signaling based services using the disclosed techniques. Also, mobile service providers can apply the disclosed techniques to provide such using OSI layer 7 signaling based security services in combination with various other enhanced security services, such as location based, mobile device identifier based, and mobile user identifier based, and/or combinations thereof, as further described below.

These and other techniques for providing OSI layer 7 signaling security with next generation firewall in mobile networks for service providers (e.g., using various packet content inspection and/or NGFW techniques, such as Application-ID, user ID, content ID, URL filtering, etc.) will be further described below.

Figure 4E:
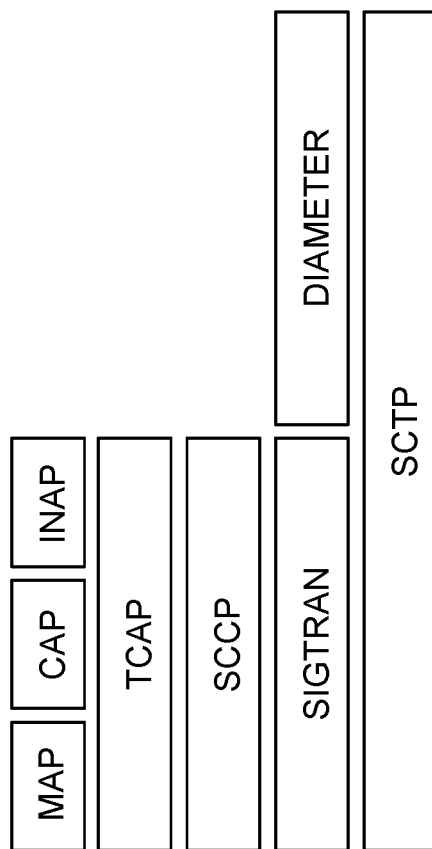
FIG. 4E illustrates an example signaling protocol stack.

FIG. 4E illustrates an example signaling protocol stack. Referring to FIG. 4E, the example signaling layers include CAP, MAP, INAP, TCAP, SCCP, SIGTRAN, Diameter, and SCTP.

Figure 4F:
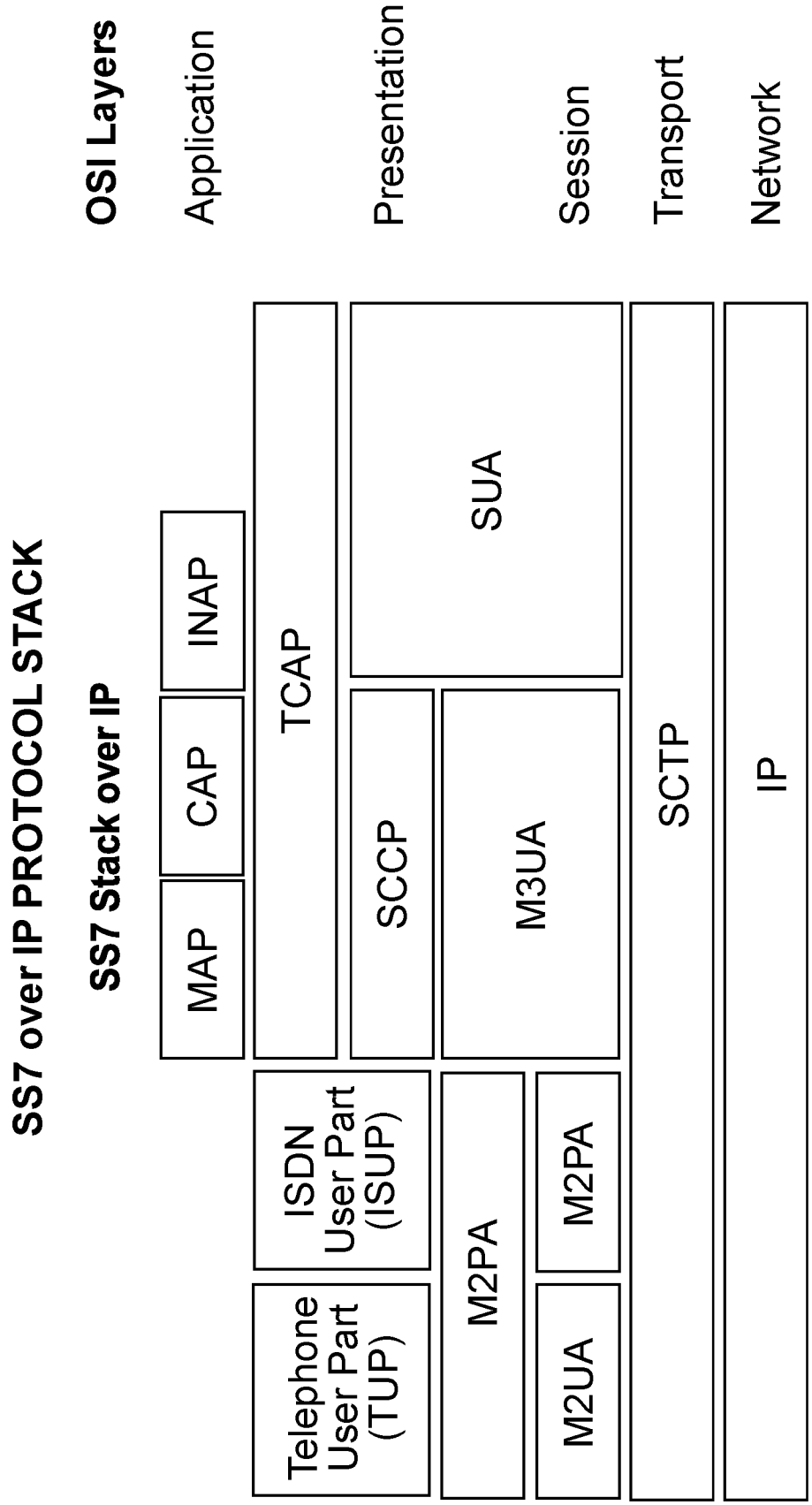
FIG. 4F illustrates an example of the SS7 over IP protocol stack.

FIG. 4F illustrates an example of the SS7 over IP protocol stack. Referring to FIG. 4F, the layer 7/application signaling layers, such as CAP, MAP, and INAP, are also shown.

Figure 5A:
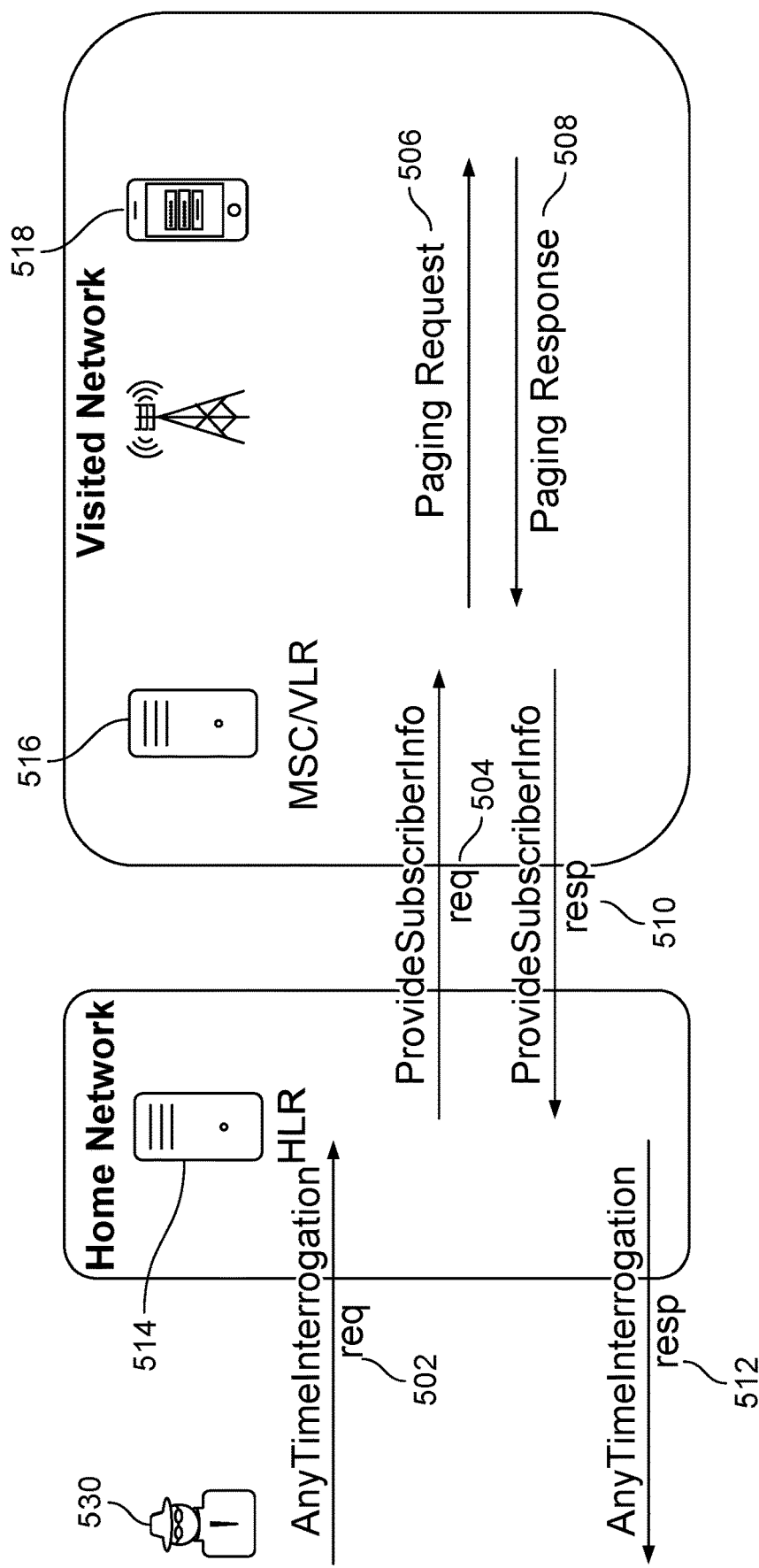
FIG. 5A is an example signaling attack with a MAP message that can be prevented to provide enhanced security for mobile/service provider networks using a security platform for security policy enforcement in accordance with some embodiments.

Example Signaling Attacks that can be Prevented to Provide Enhanced Security for Mobile/Service Provider Networks Using a Security Platform for Security Policy Enforcement Security Platform Solutions for Example MAP Protocol Vulnerabilities and Attacks FIG. 5A is an example signaling attack with a MAP message that can be prevented to provide enhanced security for mobile/service provider networks using a security platform for security policy enforcement in accordance with some embodiments. In this first example signaling attack, when a MAP anyTimeInterrogation (ATI) message 502 is sent from an unauthorized user/attacker 530 to a subscriber's HLR 514 (e.g., such an ATI message can query the subscriber's HLR for the subscriber's Cell-ID and IMEI), the ATI message triggers a provideSubscriberInfo (PSI) message 504 that is then sent to a MSC/VLR 516 to which the subscriber's device 518 is connected/in wireless communication with as shown at paging request message 506. In response, the subscriber's device 518 returns the cell identifier (Cell-ID) of the subscriber with other information as shown at a paging response message 508, and then MSC/VLR 516 returns a provideSubscriberInfo resp message 510, and HLR 514 returns an anyTimeInterrogation resp message 512 as shown.

In this example signaling attack with a MAP message, the unauthorized user/attacker can then use the anyTimeInterrogation resp message to acquire the Cell-ID of the subscriber's device. The Cell-ID can then be mapped to an actual location (e.g., to the street level) using publicly available mapping information. As such, this type of signaling attack with a MAP message can be utilized by the unauthorized user/attacker to monitor a location of the subscriber with the subscriber's permission or knowledge.

In one embodiment, the disclosed techniques can be performed by a security platform to monitor OSI layer 7/application layer signaling traffic including MAP traffic and to decode the monitored MAP traffic. A security policy can be configured to identify such a signaling attack with a MAP message and to block/drop the anyTimeInterrogation req message from untrusted/external networks to thereby not allow the unauthorized user/attacker to acquire the Cell-ID of the subscriber's device and prevent the discovery of the subscriber's location as a result.

Figure 5B:
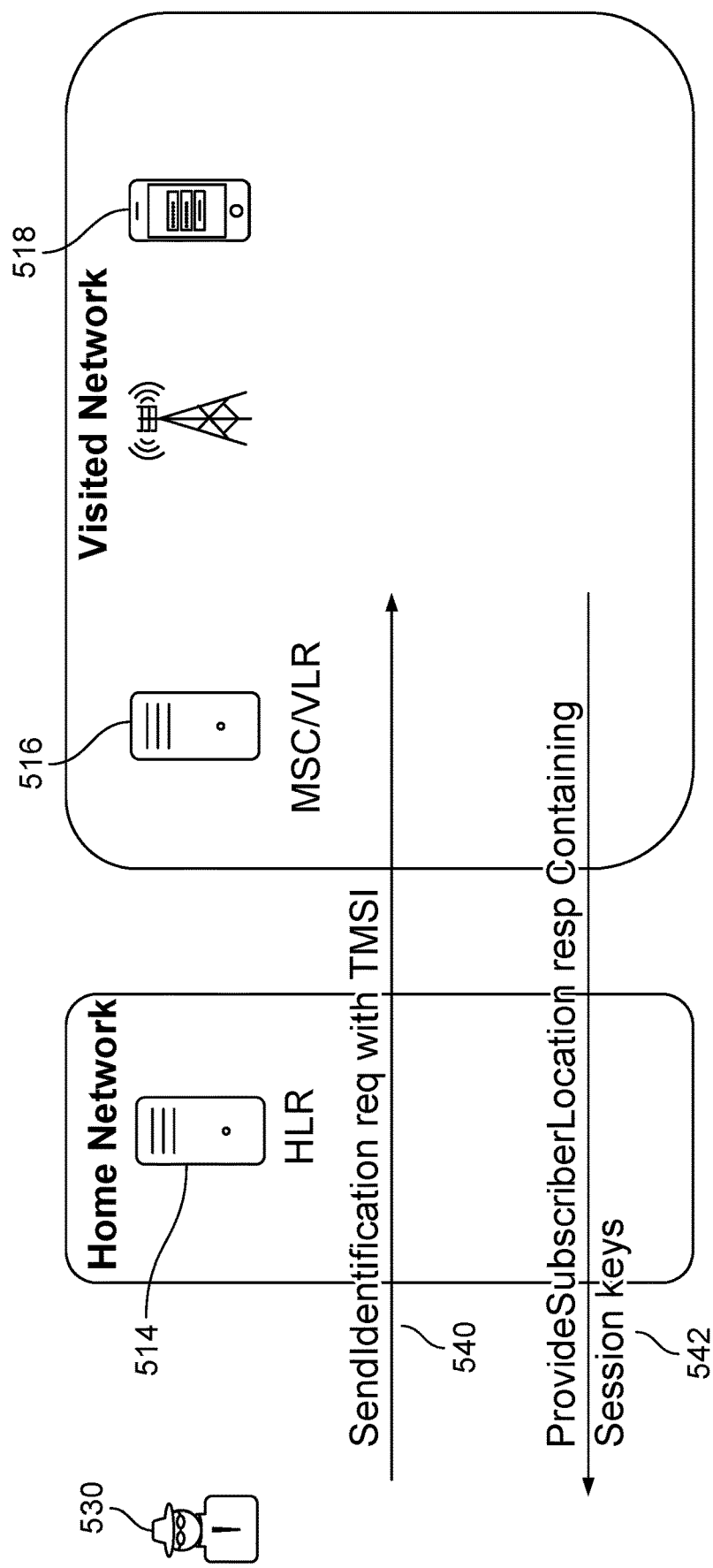
FIG. 5B is another example signaling attack with a MAP message that can be prevented to provide enhanced security for mobile/service provider networks using a security platform for security policy enforcement in accordance with some embodiments.

FIG. 5B is another example signaling attack with a MAP message that can be prevented to provide enhanced security for mobile/service provider networks using a security platform for security policy enforcement in accordance with some embodiments. In this second example signaling attack, the MSC can be requested by an unauthorized user/attacker to return the IMSI if the TMSI is known. The MSC can also be queried for the session keys for the subscriber. If the unauthorized user/attacker captures an encrypted GSM or UMTS call, then the unauthorized user/attacker can then decrypt it using the session keys.

Referring to FIG. 5B, unauthorized user/attacker 530 first captures the target's traffic over the air interface (e.g., which generally involves the unauthorized user/attacker being within a certain physical proximity of the target). Next, with access to the SS7 network, the unauthorized user/attacker can then send a sendIdentification req message with TMSI 540 to MSC/VLR 516 and retrieve the decryption keys for the target's device 518 via a provideSubscriberLocation resp containing session keys message 542. These decryption/session keys can be used to decrypt the subscriber's traffic as discussed above.

In one embodiment, the disclosed techniques can be performed by a security platform to monitor OSI layer 7/application layer signaling traffic including MAP traffic and to decode the monitored MAP traffic. A security policy can be configured to identify such a signaling attack with a MAP message and to block/drop the sendIdentification req message from untrusted/external networks.

Figure 5C:
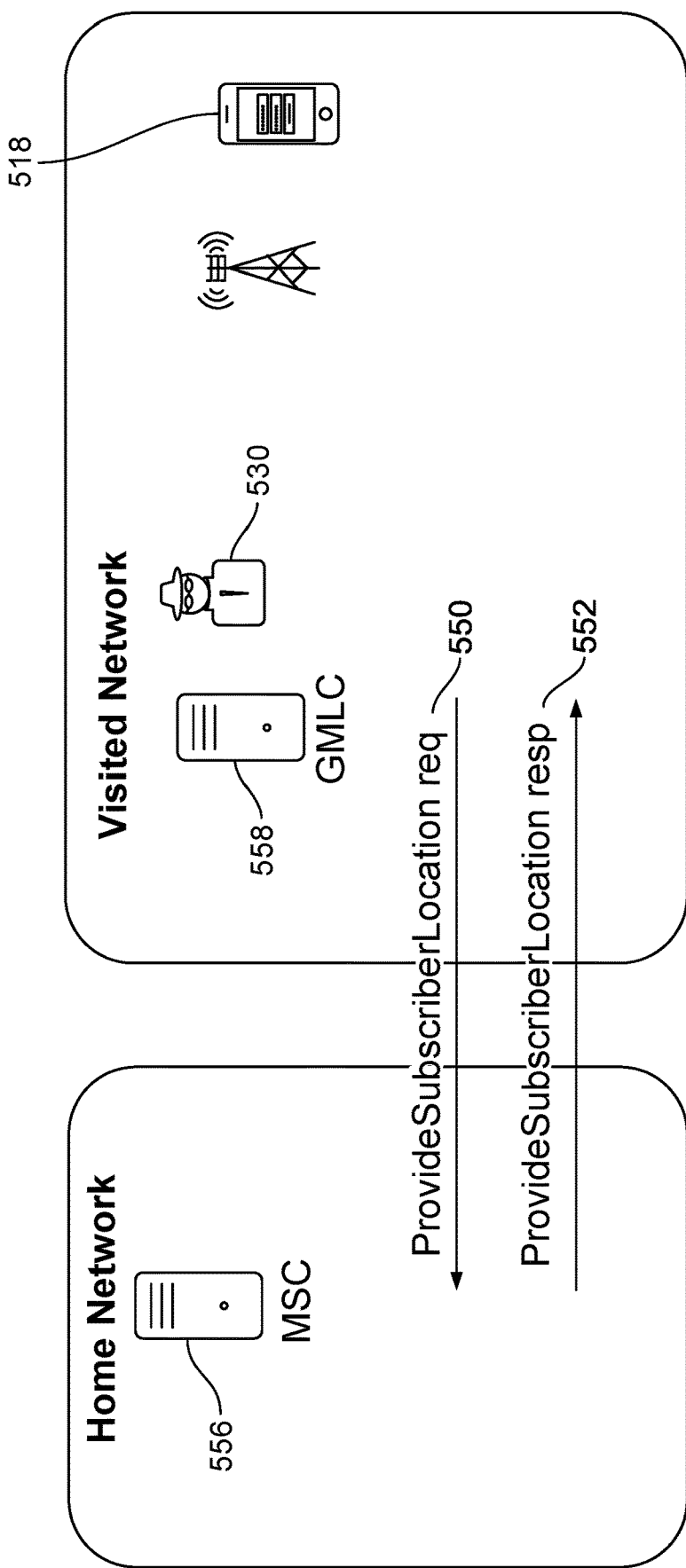
FIG. 5C is another example signaling attack with a MAP message that can be prevented to provide enhanced security for mobile/service provider networks using a security platform for security policy enforcement in accordance with some embodiments.

FIG. 5C is another example signaling attack with a MAP message that can be prevented to provide enhanced security for mobile/service provider networks using a security platform for security policy enforcement in accordance with some embodiments. In this third example signaling attack, authentication at a Gateway Mobile Location Center (GMLC) 558 can be bypassed by directly querying the VLR. In this example signaling attack, unauthorized user/attacker 530 sends a provideSubscriberLocation req message 550 to MSC 556 and then receives a provideSubscriberLocation resp message 552 as shown.

In one embodiment, the disclosed techniques can be performed by a security platform to monitor OSI layer 7 signaling traffic including MAP traffic and to decode the monitored MAP traffic. A security policy can be configured to identify such a signaling attack with a MAP message and to block/drop the provideSubscriberLocation req message from untrusted/external networks to prevent this type of signaling attack.

Security Platform Solutions for Example Diameter Protocol Vulnerabilities and Attacks A signaling flood of authentication messages is a Diameter related attack example. A signaling flood of Diameter authentication messages attack is a signaling related network outage example that can cause congestion problems on a service provider network. Specifically, a signaling flood of Diameter authentication messages can cause a congestion problem related to the number of devices re-authenticating onto the service provider network's network and that can cause some subscribers to have their mobile connectivity drop out. For example, Spark Telecom in New Zealand was impacted by a congestion issue due to a signaling flood of Diameter authentication messages, for example Diameter S6a Authentication Information Request (AIR) (see, e.g., https://www.stuff.co.nz/business/88869002/Spark-network-outages-reported-around-the-country). In one embodiment, the disclosed techniques for monitoring signaling traffic (e.g., including Diameter traffic, such as the following Diameter messages: Diameter S6a ULR (Update Location Request) and Diameter s6a AIR (Authentication Information Request)) are performed to implement a security policy and perform stateful inspection (e.g., configure a security policy that can detect and prevent such signaling flood of Diameter authentication messages attacks based on throttling/threshold limits for such authentication messages, which can include throttling per Diameter message type based on three parameters: (a) aggregation criteria per source, destination, source and destination, and (b) threshold (i.e., number of messages per second and time interval over which message are counted, during stateful inspection by the NFGW/security platform).

Security Platform Solutions for Example SS7 Protocol Vulnerabilities and Attacks Various SS7 related attack examples are well known (e.g., the Telenor SS7 attack in 2016, see, e.g., https://www-.digi.no/artikler/et-ondsinnet-angrep-mot-telenor-ville-hatt-samme-konsekvens/320604 (discussing a network wide outage that was due to an SS7 vulnerability in the affected Telenor HLR was a network wide outage of over 3 hours on the Telenor network in Norway in February 2016, which revealed that it was possible for a well-informed individual to remotely take down a network in another country all over the public SS7 network, without any physical access to the target network)). In one embodiment, the disclosed techniques for monitoring signaling traffic (e.g., including SS7 traffic) are performed to implement a security policy and perform stateful inspection (e.g., configure a security policy that can detect and prevent such SS7 attacks based on throttling/threshold limits and/or filtering of certain messages, which can include throttling per MAP message type, such as DeleteSubscriberData, SendIdentification, SendRoutingInfo, and/or other SS7 protocols message types, which can be tuned based on three parameters: (a) aggregation criteria per source, destination, source and destination, and (b) threshold (i.e., number of messages per second and time interval over which message are counted, during stateful inspection by the NFGW/security platform).

Security Platform Solutions for Example SCCP Protocol Vulnerabilities and Attacks A signaling flood of SCCP messages is an SCCP related attack example (e.g., of various SCCP message types, such as Connection Confirmed, Connection Released). Specifically, a signaling message flood at the SCCP layer can be used by an attacker to overload a signaling point like STP, SSP, and SCP and compromise its function, causing a different kind of DoS attack. In one embodiment, the disclosed techniques for monitoring network layer signaling traffic (e.g., including SCCP traffic) are performed to implement a security policy and perform stateful inspection (e.g., configure a security policy that can detect and prevent such signaling message flood at the SCCP layer attacks based on throttling/threshold limits and/or filtering of certain messages, which can include throttling per SCCP message type, such as Connection Confirmed, Connection Released, and/or other SCCP message types, which can be tuned based on three parameters: (a) aggregation criteria per source, destination, source and destination, and (b) threshold (i.e., number of messages per second and time interval over which message are counted, during stateful inspection by the NFGW/security platform).

As will now be apparent in view of the disclosed embodiments, a network service provider/mobile operator (e.g., a cellular service provider entity), MVNO provider, a device manufacturer (e.g., an automobile entity, IoT device entity, and/or other device manufacturer), and/or system integrators can specify such security policies that can be enforced by a security platform using the disclosed techniques to solve these example signaling related security problems and/or other existing or not yet discovered security related problems on service provider networks (e.g., vulnerabilities and/or attacks utilizing one or more of the above-described signaling layers on mobile service provider networks) and other technical network security challenges.

Figure 6:
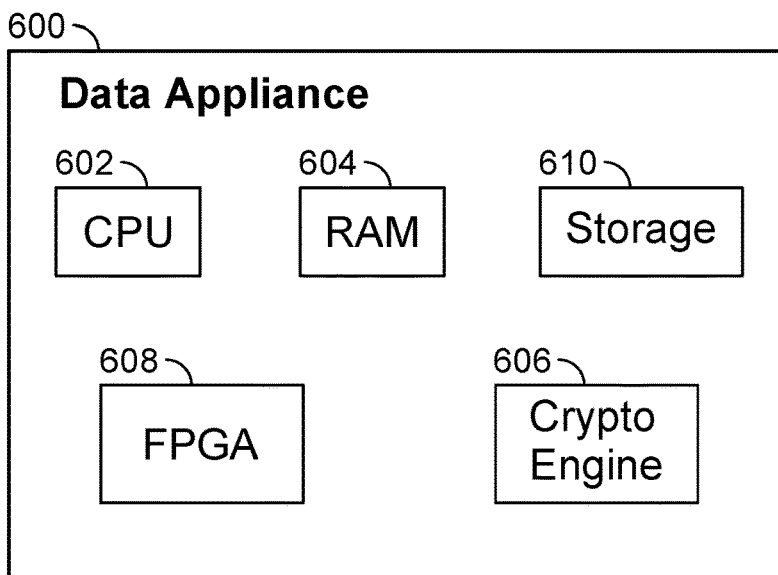
FIG. 6 is a functional diagram of hardware components of a network device for performing security policy enforcement on mobile/service provider network environments in accordance with some embodiments.

Example Hardware Components of a Network Device for Performing Security Policy Enforcement on Mobile/Service Provider Network Environments FIG. 6 is a functional diagram of hardware components of a network device for performing security policy enforcement on mobile/service provider network environments in accordance with some embodiments. The example shown is a representation of physical/hardware components that can be included in network device 600 (e.g., an appliance, gateway, or server that can implement the security platform disclosed herein). Specifically, network device 600 includes a high performance multi-core CPU 602 and RAM 604. Network device 600 also includes a storage 610 (e.g., one or more hard disks or solid state storage units), which can be used to store policy and other configuration information as well as signatures. In one embodiment, storage 610 stores location information, hardware identifier information, subscriber identity information, RAT information and associated IP addresses, and/or various other information (e.g., Application-ID, Content-ID, User-ID, URL, and/or other information, such as monitored and/or extracted from decoded network traffic, such as SCTP, Diameter over SCTP, SIGTRAN, SCCP, and/or layer 7/application layer signaling traffic, including CAP, MAP, and/or INAP, as similarly described herein) that are monitored for implementing the disclosed security policy enforcement techniques using a security platform/firewall device. Network device 600 can also include one or more optional hardware accelerators. For example, network device 600 can include a cryptographic engine 606 configured to perform encryption and decryption operations, and one or more FPGAs 608 configured to perform signature matching, act as network processors, and/or perform other tasks.

Figure 7:
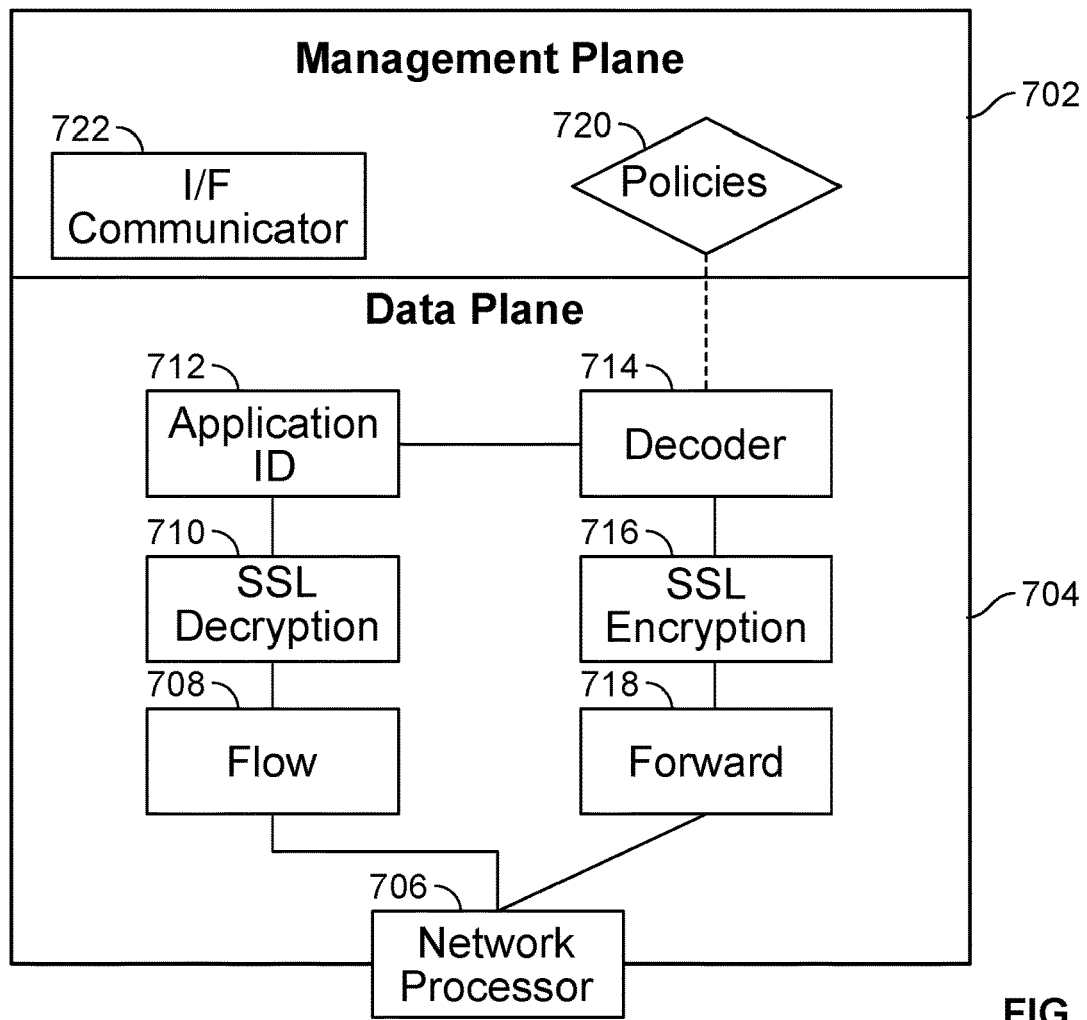
FIG. 7 is a functional diagram of logical components of a network device for performing security policy enforcement on mobile/service provider network environments in accordance with some embodiments.

Example Logical Components of a Network Device for Performing Security Policy Enforcement on Mobile/Service Provider Network Environments FIG. 7 is a functional diagram of logical components of a network device for performing security policy enforcement on mobile/service provider network environments in accordance with some embodiments. The example shown is a representation of logical components that can be included in network device 700 (e.g., a data appliance, which can implement the disclosed security platform and perform the disclosed techniques). As shown, network device 700 includes a management plane 702 and a data plane 704. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, an IoT device, or another resource) using an encrypted session protocol, such as SSL. Network processor 706 is configured to monitor packets from the mobile device, and provide the packets to data plane 704 for processing. Flow 708 identifies the packets as being part of a new session and creates a new session flow. Subsequent packets will be identified as belonging to the session based on a flow lookup. If applicable, SSL decryption is applied by SSL decryption engine 710 using various techniques as described herein. Otherwise, processing by SSL decryption engine 710 is omitted. Application identification (ID) module 712 is configured to determine what type of traffic the session involves and to identify a user associated with the traffic flow (e.g., to identify an Application-ID as described herein). For example, Application ID 712 can recognize a GET request in the received data and conclude that the session requires an HTTP decoder. As another example, Application ID 712 can recognize a Create Session Request or a Create PDP Request in the received data and conclude that the session requires a GTP decoder. For each type of protocol (e.g., various signaling protocols as discussed above, including SCTP, Diameter over SCTP, SIGTRAN, SCCP, and/or layer 7/application layer signaling traffic, including CAP, MAP, and/or INAP, and/or other signaling protocols) there exists a corresponding decoder 714. In one embodiment, the application identification is performed by an application identification module (e.g., Application ID component/engine), and a user identification is performed by another component/engine. Based on the determination made by Application ID 712, the packets are sent to an appropriate decoder 714. Decoder 714 is configured to assemble packets (e.g., which may be received out of order) into the correct order, perform tokenization, and extract out information. Decoder 714 also performs signature matching to determine what should happen to the packet. SSL encryption engine 716 performs SSL encryption using various techniques as described herein and the packets are then forwarded using a forward component 718 as shown. As also shown, policies 720 are received and stored in the management plane 702. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored GTP-C messages and/or packet content inspection of monitored GTP-U, SCTP, Diameter over SCTP, SIGTRAN, SCCP, and/or layer 7/application layer signaling traffic, including CAP, MAP, and/or INAP traffic as disclosed herein) is applied as described herein with respect to various embodiments based on the monitored, decrypted, identified, and decoded session traffic flows.

As also shown in FIG. 7, an interface (I/F) communicator 722 is also provided for security platform manager communications (e.g., via (REST) APIs, messages, or network protocol communications or other communication mechanisms). In some cases, network communications of other network elements on the service provider network are monitored using network device 700, and data plane 704 supports decoding of such communications (e.g., network device 700, including I/F communicator 722 and decoder 714, can be configured to monitor and/or communicate on, for example, Gn, Gp, S1-MME, S5, S6a/S6d, S8, X2, S9, S11, S13/S13', Gr, Gd, Gf, B, C, D, E, and/or other interfaces where wired and wireless network traffic flow exists as similarly described herein). As such, network device 700 including I/F communicator 722 can be used to implement the disclosed techniques for security policy enforcement on mobile/service provider network environments as described above and as will be further described below.

Additional example processes for the disclosed techniques for monitoring signaling traffic and performing security policy enforcement on mobile/service provider network environments will now be described.

Figure 8:
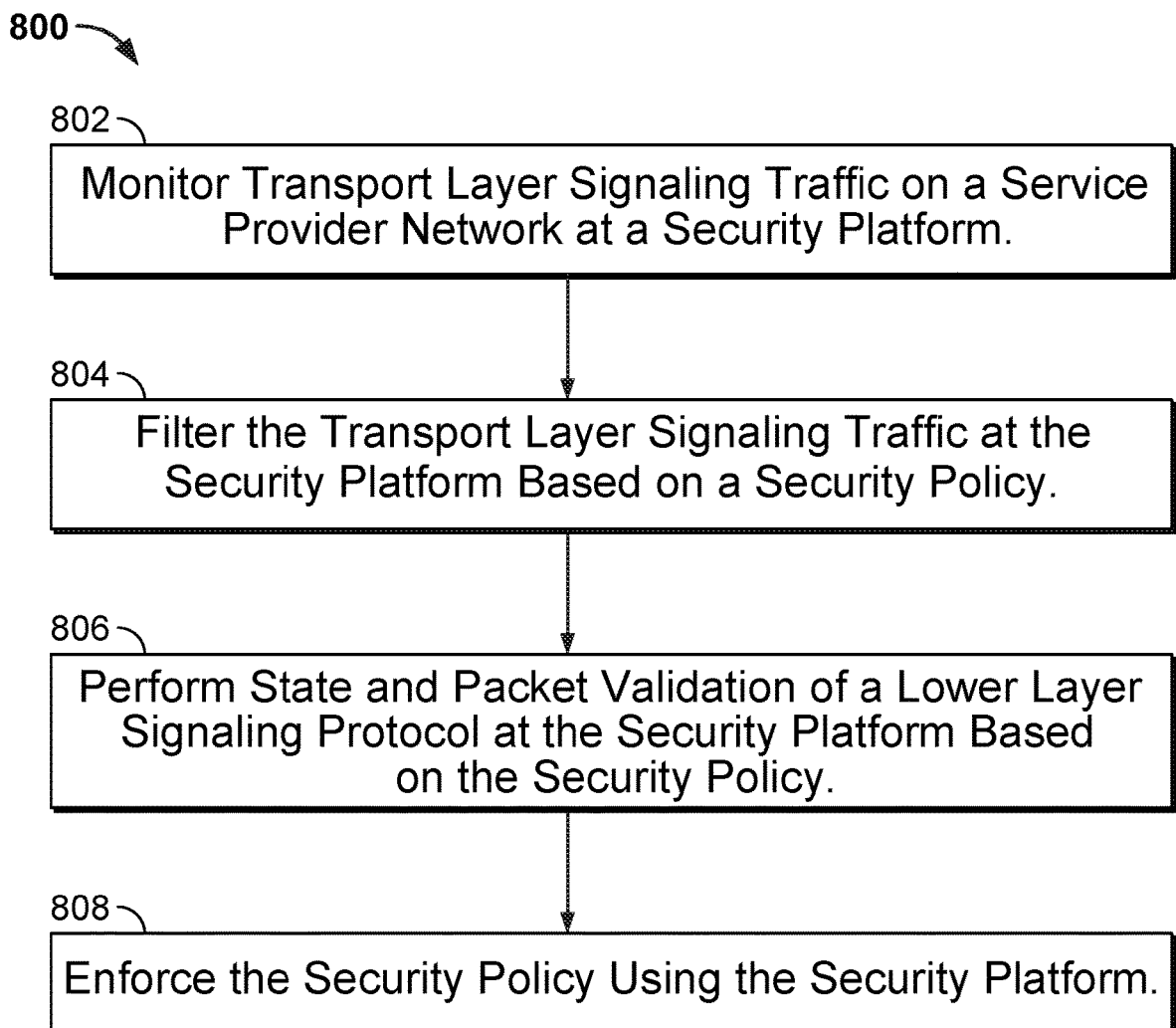
FIG. 8 is a flow diagram of a process for performing transport layer signaling based security in mobile networks for service providers in accordance with some embodiments.

Example Processes for Transport Layer Signaling Security with Next Generation Firewall in Mobile Networks for Service Providers FIG. 8 is a flow diagram of a process for performing transport layer signaling based security in mobile networks for service providers in accordance with some embodiments. In some embodiments, a process 800 as shown in FIG. 8 is performed by the security platform and techniques as similarly described above including the embodiments described above with respect to FIGS. 1A-7. In one embodiment, process 800 is performed by data appliance 600 as described above with respect to FIG. 6, network device 700 as described above with respect to FIG. 7, a virtual appliance, an SDN security solution, a cloud security service, and/or combinations or hybrid implementations of the aforementioned as described herein.

The process begins at 802. At 802, monitoring transport layer signaling traffic on a service provider network at a security platform is performed. For example, the security platform (e.g., a firewall, a network sensor acting on behalf of the firewall, or another device/component that can implement security policies) can monitor SIGTRAN traffic on the mobile core network.

At 804, filtering the transport layer signaling traffic at the security platform based on a security policy is performed. For example, the security platform can filter the transport layer signaling traffic protocol (e.g., SIGTRAN protocol) and a higher layer signaling protocol (e.g., SCCP protocol) based on the security policy.

At 806, state and packet validation of a lower layer signaling protocol is performed based on the security policy.

For example, the security platform can perform state and packet validation of the underlying SCTP protocol per payload protocol identifier (PPID) and source/destination IP addresses while filtering SIGTRAN protocol messages.

In one embodiment, the security platform performs filtering of any SIGTRAN protocol messages while performing state and packet validation of the underlying SCTP protocol per PPID and source/destination or both IP/IPs. For example, the security platform can filter M3UA protocol messages while performing state and packet validation of the underlying SCTP protocol per PPID and source/destination IP addresses (IPs). As another example, the security platform can filter M2UA protocol messages while performing state and packet validation of the underlying SCTP protocol per PPID and source/destination IPs. As another example, the security platform can filter SUA protocol messages while performing state and packet validation of the underlying SCTP protocol per PPID and source/destination IPs. As another example, the security platform can filter M2PA protocol messages while performing state and packet validation of the underlying SCTP protocol per PPID and source/destination IPs.

At 808, enforcing the security policy using the security platform is performed. For example, various enforcement actions (e.g., allow/pass, block/drop, alert, tag, monitor, log, throttle, restrict access, and/or other enforcement actions) can be performed using the security platform as similarly described above. For example, the security platform can block a message filtered in the transport layer signaling traffic or a higher layer of signaling traffic based on the security policy.

In an example implementation, the security platform can extract adaptation layer information from the PPID field in the SCTP data chunk received for the firewall sessions that are installed for the SCTP protocol. These firewall sessions are related to successful SCTP associations that completed a 4-way handshake and other packet level checks. PPID are allotted by IANA (e.g., specified at https://www.iana.org/assignments/sctp-parameters/sctp-parameters.xhtml). PPID information can be used by the security platform to apply a filtering mechanism and rate limiting mechanisms to facilitate enhanced signaling security on mobile service provider networks.

In one embodiment, the security platform performs rate limiting of any SIGTRAN protocol messages with aggregation criteria of source, destination, or source and destination IP/IPs, time interval in seconds and threshold/number of hits while performing state and packet validation of the underlying SCTP protocol. For example, the security platform can perform rate limiting of M3UA protocol messages with aggregation criteria of source, destination, or source and destination IP/IPs, time interval in seconds and threshold/number of hits while performing state and packet validation of the underlying SCTP protocol. As another example, the security platform can perform rate limiting of M2UA protocol messages with aggregation criteria of source, destination, or source and destination IP/IPs, time interval in seconds and threshold/number of hits while performing state and packet validation of the underlying SCTP protocol. As another example, the security platform can perform rate limiting M2PA protocol messages with aggregation criteria of source, destination, or source and destination IP/IPs, time interval in seconds and threshold/number of hits while performing state and packet validation of the underlying SCTP protocol. As another example, the security platform can perform rate limiting of SUA protocol messages with aggregation criteria of source, destination, or source and destination IP/IPs, time interval in seconds and threshold/number of hits while performing state and packet validation of the underlying SCTP protocol.

Figure 9:
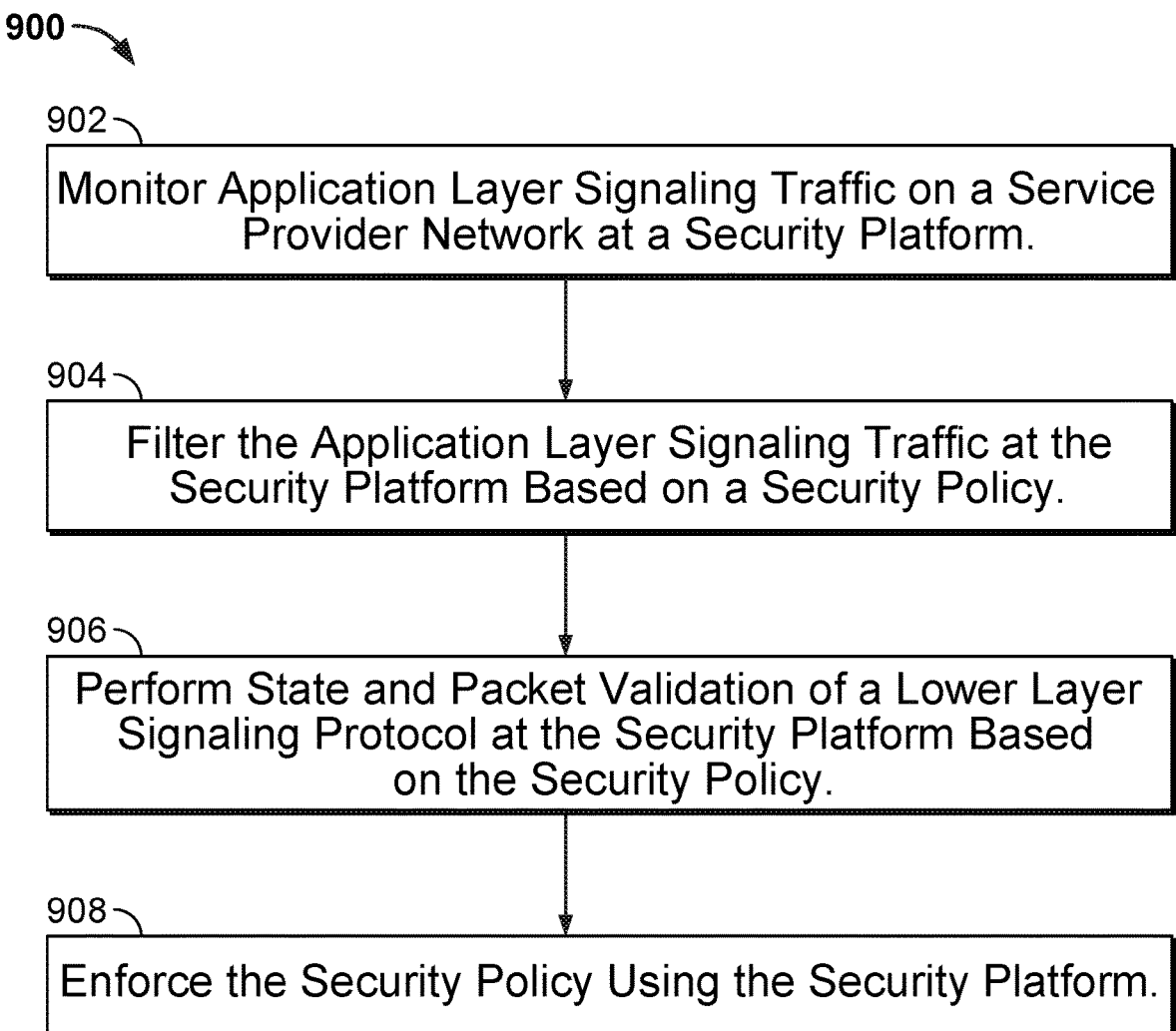
FIG. 9 is a flow diagram of a process for performing application layer signaling based security in mobile networks for service providers in accordance with some embodiments.

Example Processes for Application Layer Signaling Security with Next Generation Firewall in Mobile Networks for Service Providers FIG. 9 is a flow diagram of a process for performing application layer signaling based security in mobile networks for service providers in accordance with some embodiments. In some embodiments, a process 900 as shown in FIG. 9 is performed by the security platform and techniques as similarly described above including the embodiments described above with respect to FIGS. 1A-7. In one embodiment, process 900 is performed by data appliance 600 as described above with respect to FIG. 6, network device 700 as described above with respect to FIG. 7, a virtual appliance, an SDN security solution, a cloud security service, and/or combinations or hybrid implementations of the aforementioned as described herein.

The process begins at 902. At 902, monitoring application layer signaling traffic on a service provider network at a security platform is performed. For example, the security platform (e.g., a firewall, a network sensor acting on behalf of the firewall, or another device/component that can implement security policies) can monitor MAP, CAP, and/or INAP traffic on the mobile core network.

At 904, filtering the application layer signaling traffic at the security platform based on a security policy is performed. For example, the security platform can filter the application layer signaling traffic protocol (e.g., MAP, CAP, and/or INAP protocol) and a lower layer signaling protocol (e.g., SCCP protocol) based on the security policy.

At 906, state and packet validation of a lower layer signaling protocol is performed based on the security policy. For example, the security platform can perform state and packet validation of the underlying SCTP protocol while filtering MAP, CAP, or INAP protocol messages (e.g., or other layer-7/application layer messages).

In one embodiment, the security platform performs state and packet validation of the underlying SCTP protocol while filtering MAP, CAP, or INAP protocol messages. For example, the security platform can perform state and packet validation of the underlying SCTP protocol while filtering MAP, CAP, or INAP protocol messages per subsystem number (SSN) and source/destination IP addresses (IPs). As another example, the security platform can perform state and packet validation of the underlying SCTP protocol while filtering MAP, CAP, or INAP protocol messages per SSN, Global Title (GT), and IPs. As another example, the security platform can perform state and packet validation of the underlying SCTP protocol while filtering MAP, CAP, or INAP protocol messages per SSN, GT, opcode, and IPs.

At 908, enforcing the security policy using the security platform is performed. For example, various enforcement actions (e.g., allow/pass, block/drop, alert, tag, monitor, log, throttle, restrict access, and/or other enforcement actions) can be performed using the security platform as similarly described above. For example, the security platform can block a message filtered in the application layer signaling traffic or a lower layer of signaling traffic based on the security policy.

In one embodiment, the security platform performs rate limiting of any OSI layer 7/application layer signaling protocol(s) messages (e.g., MAP, CAP, or INAP) with aggregation criteria of source, destination, or source and destination IP/IPs, time interval in seconds and threshold/number of hits while performing state and packet validation of the underlying SCTP protocol. For example, the security platform can perform rate limiting of any OSI layer 7 signaling protocol(s) messages (e.g., MAP, CAP, or INAP) per opcode (e.g., when applicable) with aggregation criteria of source, destination, or source and destination IP/IPs, time interval in seconds and threshold/number of hits while performing state and packet validation of the underlying SCTP protocol.

Figure 10:
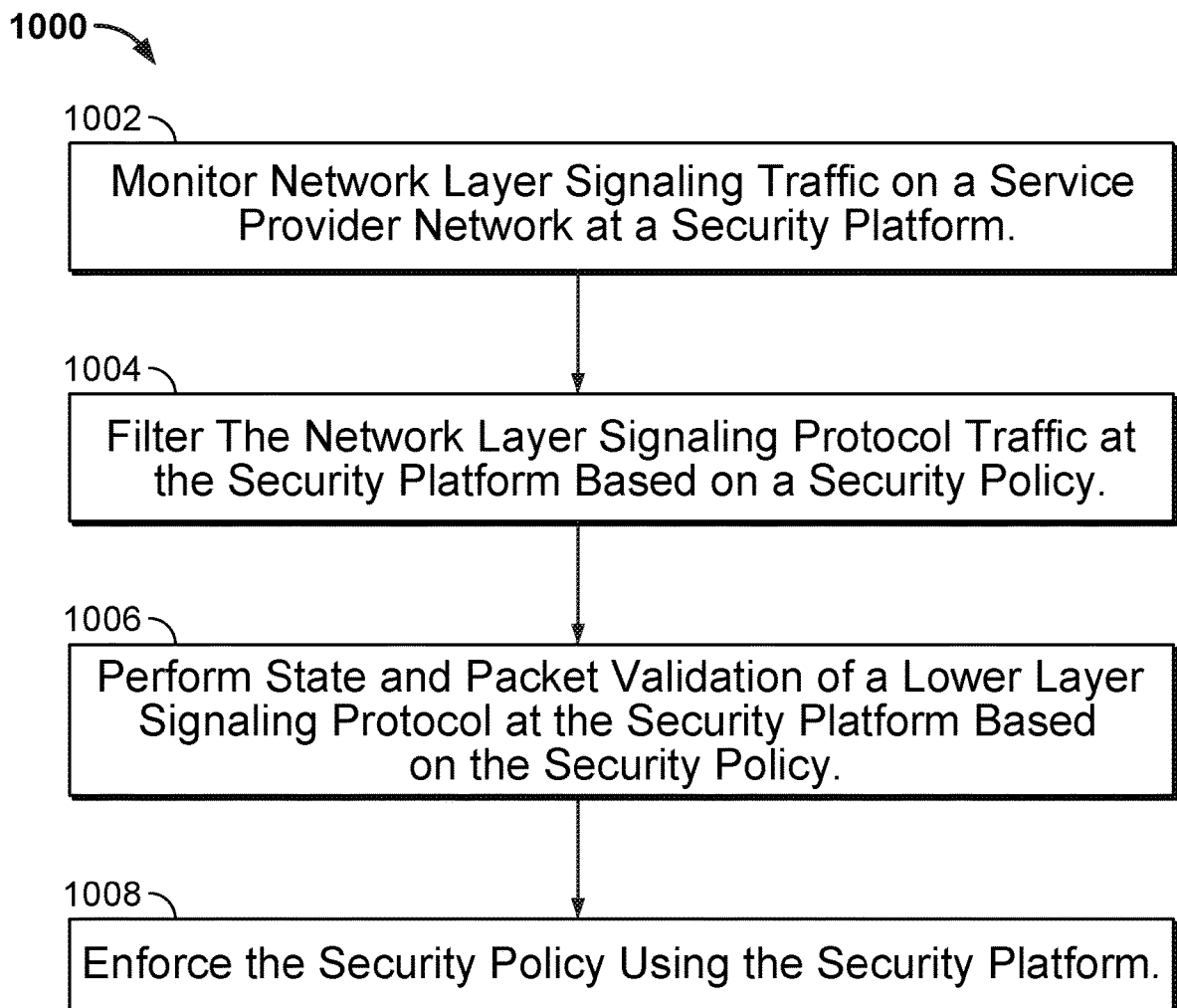
FIG. 10 is a flow diagram of a process for performing network layer signaling based security in mobile networks for service providers in accordance with some embodiments.

Example Processes for Network Layer Signaling Security with Next Generation Firewall in Mobile Networks for Service Providers FIG. 10 is a flow diagram of a process for performing network layer signaling based security in mobile networks for service providers in accordance with some embodiments. In some embodiments, a process 1000 as shown in FIG. 10 is performed by the security platform and techniques as similarly described above including the embodiments described above with respect to FIGS. 1A-7. In one embodiment, process 1000 is performed by data appliance 600 as described above with respect to FIG. 6, network device 700 as described above with respect to FIG. 7, a virtual appliance, an SDN security solution, a cloud security service, and/or combinations or hybrid implementations of the aforementioned as described herein.

The process begins at 1002. At 1002, monitoring network layer signaling traffic on a service provider network at a security platform is performed. For example, the security platform (e.g., a firewall, a network sensor acting on behalf of the firewall, or another device/component that can implement security policies) can monitor SCCP traffic on the mobile core network.

At 1004, filtering the network layer signaling protocol traffic at the security platform based on a security policy is performed. For example, the security platform can filter the SCCP protocol and a lower layer signaling protocol (e.g., SCTP protocol) or a higher layer of signaling traffic (e.g., MAP, CAP, or INAP, or other layer-7/application layer messages) based on the security policy.

At 1006, state and packet validation of a lower layer signaling protocol is performed based on the security policy. For example, the security platform can perform state and packet validation of the underlying SCTP protocol while filtering the SCCP protocol traffic.

In one embodiment, the security platform performs state and packet validation of the underlying SCTP protocol while filtering the SCCP protocol traffic. For example, the security platform can perform state and packet validation of the underlying SCTP protocol while filtering the SCCP protocol traffic per source/destination IP addresses (IPs). As another example, the security platform can perform state and packet validation of the underlying SCTP protocol while filtering the SCCP protocol traffic per GT and source/destination IPs.

At 1008, enforcing the security policy using the security platform is performed. For example, various enforcement actions (e.g., allow/pass, block/drop, alert, tag, monitor, log, throttle, restrict access, and/or other enforcement actions) can be performed using the security platform as similarly described above. For example, the security platform can block a message filtered in the SCCP protocol traffic or a lower/higher layer of signaling traffic based on the security policy.

In one embodiment, the security platform performs rate limiting of any SCCP messages with aggregation criteria of source, destination, or source and destination IP/IPs, time interval in seconds and threshold/number of hits while performing state and packet validation of the underlying SCTP protocol.

Figure 11:
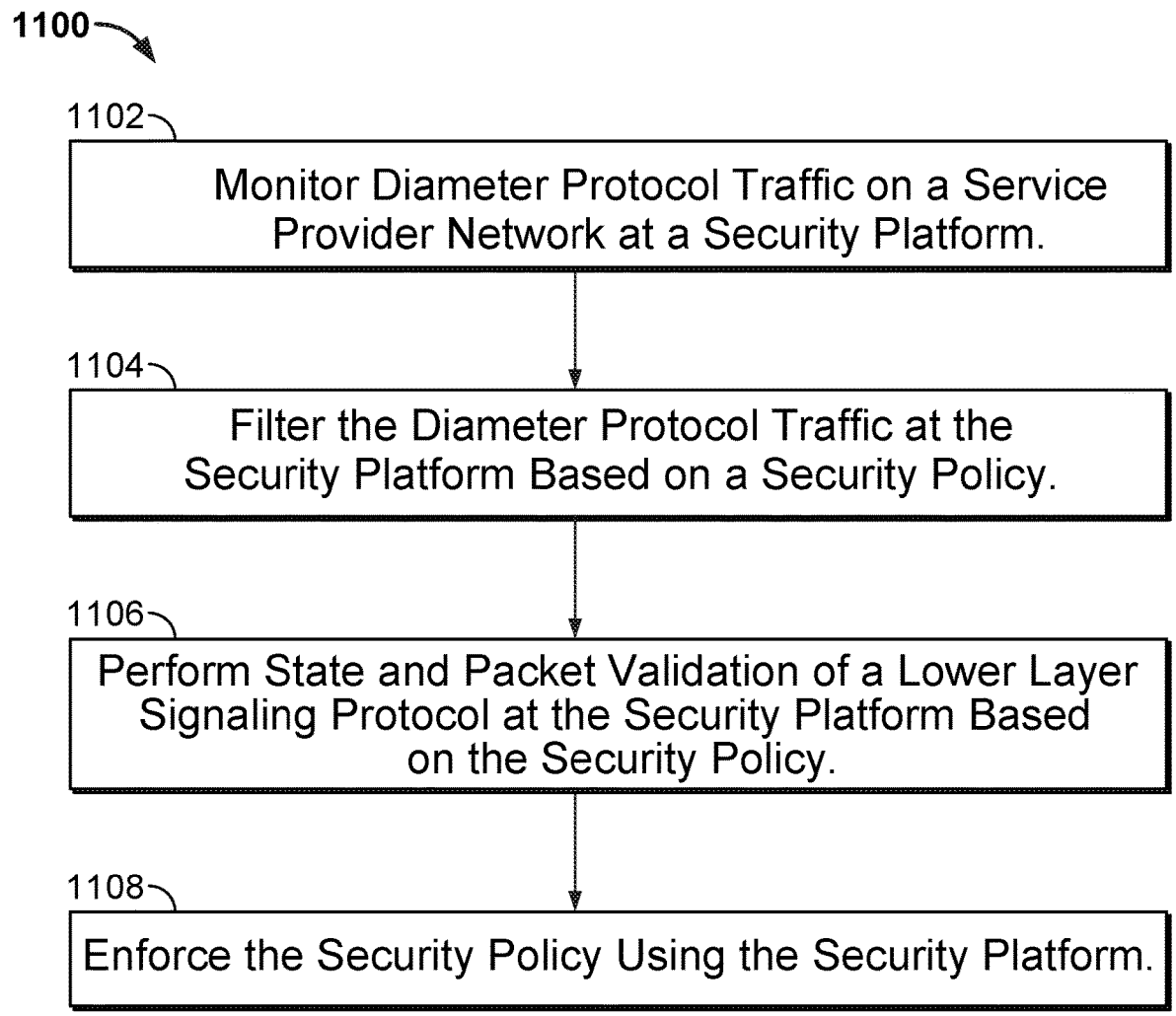
FIG. 11 is a flow diagram of a process for performing Diameter over SCTP-based security in mobile networks for service providers in accordance with some embodiments.

Example Processes for Diameter over SCTP Security with Next Generation Firewall in Mobile Networks for Service Providers FIG. 11 is a flow diagram of a process for performing Diameter over SCTP-based security in mobile networks for service providers in accordance with some embodiments. In some embodiments, a process 1100 as shown in FIG. 11 is performed by the security platform and techniques as similarly described above including the embodiments described above with respect to FIGS. 1A-7. In one embodiment, process 1100 is performed by data appliance 600 as described above with respect to FIG. 6, network device 700 as described above with respect to FIG. 7, a virtual appliance, an SDN security solution, a cloud security service, and/or combinations or hybrid implementations of the aforementioned as described herein.

The process begins at 1102. At 1102, monitoring Diameter protocol traffic (e.g., the Diameter protocol refers to an Authentication, Authorization, and Accounting (AAA) protocol, and Diameter applications such as S6a/S6d, S9, Gx extend the functionality of Diameter base protocol for mobile network specific use cases) on a service provider network at a security platform is performed. For example, the security platform (e.g., a firewall, a network sensor acting on behalf of the firewall, or another device/component that can implement security policies) can monitor Diameter traffic on the mobile core network.

At 1104, filtering the Diameter protocol traffic at the security platform based on a security policy is performed. For example, the security platform can filter the Diameter protocol and a lower layer signaling protocol (e.g., SCTP protocol) based on the security policy.

At 1106, state and packet validation of a lower layer signaling protocol is performed based on the security policy. For example, the security platform can perform state and packet validation of the underlying SCTP protocol while filtering the Diameter protocol traffic.

In one embodiment, the security platform performs state and packet validation of the underlying SCTP protocol while filtering the Diameter protocol traffic. For example, the security platform can perform state and packet validation of the underlying SCTP protocol while filtering the Diameter protocol traffic per source/destination IP addresses (IPs). As another example, the security platform can perform state and packet validation of the underlying SCTP protocol while filtering the Diameter protocol traffic per Application-ID and source/destination IPs. As another example, the security platform can perform state and packet validation of the underlying SCTP protocol while filtering the Diameter protocol traffic per Application ID, Command Code, and source/destination IPs. As another example, the security platform can perform state and packet validation of the underlying SCTP protocol while filtering the Diameter protocol traffic per Application ID, Command Code, AVP, and source/destination IPs.

At 1108, enforcing the security policy using the security platform is performed. For example, various enforcement actions (e.g., allow/pass, block/drop, alert, tag, monitor, log, throttle, restrict access, and/or other enforcement actions) can be performed using the security platform as similarly described above. For example, the security platform can block a message filtered in the Diameter protocol traffic or a lower/higher layer of signaling traffic based on the security policy.

In one embodiment, the security platform performs rate limiting of any Diameter messages with aggregation criteria of source, destination, or source and destination IP/IPs, time interval in seconds and threshold/number of hits while performing state and packet validation of the underlying SCTP protocol. For example, the security platform can perform rate limiting of any Diameter messages per Application ID with aggregation criteria of source, destination, or source and destination IP/IPs, time interval in seconds and threshold/number of hits while performing state and packet validation of the underlying SCTP protocol. As another example, the security platform can perform rate limiting of any Diameter messages per Command Code with aggregation criteria of source, destination, or source and destination IP/IPs, time interval in seconds and threshold/number of hits while performing state and packet validation of the underlying SCTP protocol. As another example, the security platform can perform rate limiting of any Diameter messages per AVP with aggregation criteria of source, destination, or source and destination IP/IPs, time interval in seconds and threshold/number of hits while performing state and packet validation of the underlying SCTP protocol.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        monitor a network layer signaling protocol traffic on a service provider network at a security platform;
        perform rate limiting of messages in the network layer signaling protocol traffic at the security platform based on a security policy, wherein the network layer signaling protocol is a Signaling Connection Control Part (SCCP) protocol; and
        perform state and packet validation of the SCCP protocol per payload protocol identifier (PPID) and source/destination IP addresses while performing rate limiting of SCCP messages; and
    a memory coupled to the processor and configured to provide the processor with instructions.

2. The system recited in claim 1, wherein the security platform is configured with a plurality of security policies based on the SCCP protocol.

3. The system recited in claim 1, wherein the processor is further configured to perform security policy enforcement based on the network layer signaling protocol.

4. The system recited in claim 1, wherein the processor is further configured to perform state and packet validation of the network layer signaling protocol based on the security policy.

5. The system recited in claim 1, wherein the processor is further configured to perform rate limiting of any SCCP messages with aggregation criteria of source, destination, or source and destination IP/IPs, time interval in seconds and threshold/number of hits while performing state and packet validation of the SCTP protocol.

6. The system recited in claim 1, wherein a signaling transport protocol is a signaling transport (SIGTRAN) protocol, and wherein the processor is further configured to perform state and packet validation of the SCCP protocol per PPID and source/destination IP addresses while filtering SIGTRAN protocol messages.

7. The system recited in claim 1, wherein the processor is further configured to perform threat prevention based on a signaling transport protocol.

8. The system recited in claim 1, wherein the security platform monitors wireless interfaces including a plurality of interfaces for a signaling control protocol and user data traffic in a mobile core network for a 3G and/or 4G network.

9. The system recited in claim 1, wherein the processor is further configured to block a message filtered in the network layer signaling protocol traffic based on the security policy.

10. The system recited in claim 1, wherein the processor is further configured to block a message filtered in the network layer signaling protocol traffic or a higher layer of signaling traffic based on the security policy.

11. A method, comprising:
    monitoring a network layer signaling protocol traffic on a service provider network at a security platform; and
    performing rate limiting of messages in the network layer signaling protocol traffic at the security platform based on a security policy, wherein the network layer signaling protocol is a Signaling Connection Control Part (SCCP) protocol; and
    performing state and packet validation of the SCCP protocol per payload protocol identifier (PPID) and source/destination IP addresses while performing rate limiting of SCCP messages.

12. The method of claim 11, wherein the security platform is configured with a plurality of security policies based on the SCCP protocol.

13. The method of claim 11, wherein the method further comprises performing security policy enforcement based on the network layer signaling protocol.

14. The method of claim 11, wherein the method further comprises performing state and packet validation of the network layer signaling protocol based on the security policy.

15. The method of claim 11, wherein the method further comprises performing rate limiting of any SCCP messages with aggregation criteria of source, destination, or source and destination IP/IPs, time interval in seconds and threshold/number of hits while performing state and packet validation of the SCTP protocol.

16. A computer program product, the computer program product being embodied in a non-transitory computer readable storage medium and comprising computer instructions for:
    monitoring a network layer signaling protocol traffic on a service provider network at a security platform; and
    performing rate limiting of messages in the network layer signaling protocol traffic at the security platform based on a security policy, wherein the network layer signaling protocol is a Signaling Connection Control Part (SCCP) protocol; and
    performing state and packet validation of the SCCP protocol per payload protocol identifier (PPID) and source/destination IP addresses while performing rate limiting of SCCP messages.

17. The computer program product recited in claim 16, wherein the security platform is configured with a plurality of security policies based on the SCCP protocol.

18. The computer program product recited in claim 16, wherein the computer program product further comprises computer instructions for performing security policy enforcement based on the network layer signaling protocol.

19. The computer program product recited in claim 16, wherein the computer program product further comprises computer instructions for performing state and packet validation of the network layer signaling protocol based on the security policy.

20. The computer program product recited in claim 16, wherein the computer program product further comprises computer instructions for performing rate limiting of any SCCP messages with aggregation criteria of source, destination, or source and destination IP/IPs, time interval in seconds and threshold/number of hits while performing state and packet validation of the SCTP protocol.

\* \* \* \* \*